United States Patent
Kakuwa

(10) Patent No.: US 11,050,067 B2
(45) Date of Patent: Jun. 29, 2021

(54) FUEL CELL SYSTEM

(71) Applicant: Panasonic Intellectual Property Management Co., Ltd., Osaka (JP)

(72) Inventor: Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 399 days.

(21) Appl. No.: 15/939,408

(22) Filed: Mar. 29, 2018

(65) Prior Publication Data

US 2018/0301718 A1 Oct. 18, 2018

(30) Foreign Application Priority Data

Apr. 18, 2017 (JP) .............................. JP2017-082232

(51) Int. Cl.
| | |
|---|---|
| *H01M 8/04014* | (2016.01) |
| *C01B 3/36* | (2006.01) |
| *H01M 8/0662* | (2016.01) |
| *H01M 8/04746* | (2016.01) |
| *H01M 8/12* | (2016.01) |
| *H01M 8/04089* | (2016.01) |
| *F23D 14/22* | (2006.01) |

(52) U.S. Cl.
CPC ......... *H01M 8/04022* (2013.01); *C01B 3/363* (2013.01); *F23D 14/22* (2013.01); *H01M 8/04097* (2013.01); *H01M 8/04776* (2013.01); *H01M 8/0662* (2013.01); *H01M 8/12* (2013.01); *C01B 2203/066* (2013.01)

(58) Field of Classification Search
CPC ...... F23D 14/22; C01B 3/363; H01M 8/0662; H01M 8/04776
See application file for complete search history.

(56) References Cited

U.S. PATENT DOCUMENTS

| | | | |
|---|---|---|---|
| 2003/0129555 A1 | 7/2003 | Mukai et al. | |
| 2010/0136378 A1* | 6/2010 | Lee | C01B 3/363 |
| | | | 429/423 |
| 2018/0145347 A1 | 5/2018 | Kakuwa et al. | |

FOREIGN PATENT DOCUMENTS

| | | |
|---|---|---|
| EP | 3121514 A1 | 1/2017 |
| EP | 3246976 A1 | 11/2017 |
| EP | 3297079 A1 | 3/2018 |
| JP | 2003-254514 | 9/2003 |
| WO | 2013/161179 | 10/2013 |
| WO | 2016/181596 A1 | 11/2016 |

OTHER PUBLICATIONS

The Extended European Search Report dated Sep. 17, 2018 for the related European Patent Application No. 18166778.3.

* cited by examiner

*Primary Examiner* — Ladan Mohaddes
(74) *Attorney, Agent, or Firm* — McDermott Will and Emery LLP

(57) ABSTRACT

A fuel cell system includes a fuel cell, and a burner. The burner has anode off-gas apertures and first and second cathode off-gas apertures. In a cross section of the burner at a cutting plane that passes a first cathode off-gas aperture, an anode off-gas aperture, and a second cathode off-gas aperture that are aligned on a straight line when seen in plan view, the first cathode off-gas aperture is provided on one side of the anode off-gas aperture such that a vector of an ejecting direction of cathode off-gas forms a first acute angle with a vector of an ejecting direction of anode off-gas, and the second cathode off-gas aperture is provided on the other side of the anode off-gas aperture such that the vector of the ejecting direction of cathode off-gas forms a second acute angle with the vector of the ejecting direction of anode off-gas.

12 Claims, 15 Drawing Sheets

FIG. 5

| DESIGN PARAMETER | LOW-HEAT COMBUSTION (LEAN HYDROGEN COMBUSTION) | HIGH-HEAT COMBUSTION (HYDROCARBON GAS COMBUSTION) |
|---|---|---|
| $\theta_1 = 30°, L_1 = 7$ mm<br>$\theta_2 = 30°, L_2 = 7$ mm | DID NOT STABILIZE | DID NOT STABILIZE |
| $\theta_1 = 45°, L_1 = 7$ mm<br>$\theta_2 = 45°, L_2 = 7$ mm | STABILIZED AT r1 = 1.5 TO 2.0 | STABILIZED AT r1 = 1.0 TO 3.0 |
| $\theta_1 = 70°, L_1 = 7$ mm<br>$\theta_2 = 70°, L_2 = 7$ mm | STABILIZED AT r1 = 1.5 TO 3.0 | DID NOT STABILIZE DUE TO COMBUSTION OSCILLATION |

FIG. 9

| DESIGN PARAMETER | $\lambda_1=0.8$ | $\lambda_1=0.9$ | $\lambda_1=1.0$ | $\lambda_1=1.2$ | $\lambda_1=1.4$ | $\lambda_1=1.6$ |
|---|---|---|---|---|---|---|
| · LOWER GAS EJECTION STRUCTURE $\theta_1=45°$, $L_1=7$ mm $\theta_2=45°$, $L_2=7$ mm · UPPER GAS EJECTION STRUCTURE $\theta_3=55°$ $\theta_4=55°$ | IMPERFECT COMBUSTION | PERFECT COMBUSTION | | BURN ONLY WITH AIR FROM LOWER GAS EJECTION STRUCTURE | | |
| · LOWER GAS EJECTION STRUCTURE $\theta_1=45°$, $L_1=7$ mm $\theta_2=45°$, $L_2=7$ mm · UPPER GAS EJECTION STRUCTURE $\theta_3=70°$ $\theta_4=70°$ | PERFECT COMBUSTION | | | BURN ONLY WITH AIR FROM LOWER GAS EJECTION STRUCTURE | | |
| · LOWER GAS EJECTION STRUCTURE $\theta_1=45°$, $L_1=7$ mm $\theta_2=45°$, $L_2=7$ mm · UPPER GAS EJECTION STRUCTURE $\theta_3=90°$ $\theta_4=90°$ | BURN ONLY WITH AIR FROM LOWER GAS EJECTION STRUCTURE DID NOT STABILIZE DUE TO COMBUSTION OSCILLATION | | | | | |

PRACTICAL RANGE: $\lambda_1=0.8$ to $\lambda_1=1.0$

FUEL CELL SYSTEM

BACKGROUND

1. Technical Field

The present disclosure relates to a fuel cell system.

2. Description of the Related Art

Various techniques have been proposed relating to the stability and durability of combustion in a burner in which anode off-gas and cathode off-gas from a fuel cell burn.

For example, Japanese Unexamined Patent Application Publication No. 2003-254514 discloses a burner in which a fuel ejecting portion is provided in the center of the burner, and a tapered combustion space that surrounds the fuel ejecting portion and has an increasing width in a flame flowing direction is defined by a combustion chamber, as shown in FIG. 12.

The burner disclosed in Japanese Unexamined Patent Application Publication No. 2003-254514 is configured so that fuel such as anode off-gas or town gas is ejected horizontally from a fuel aperture of the fuel ejecting portion into the combustion space. It is also configured so that air is ejected from multiple air apertures equally spaced on the circumference of the combustion chamber into the combustion space. This can cause collision of at least part of the two types of gas, thus improving the combustion performance of the burner.

In the burner disclosed in Japanese Unexamined Patent Application Publication No. 2003-254514, the air aperture and the fuel aperture are positioned so as to be aligned on a straight line when the burner is seen in plan view. This produces appropriate collision between the fuel and the air in the combustion space, promoting the mixed combustion of the two types of gas.

Further, in the burner disclosed in Japanese Unexamined Patent Application Publication No. 2003-254514, air is also ejected from an air aperture provided at the bottom of the combustion chamber. In this case, combustion reaction of hydrogen gas, which has a higher burning velocity, completes at a position somewhat higher than the position of gas collision. Meanwhile, combustion reaction of hydrocarbon gas having a lower burning velocity, such as town gas, completes in a downstream region where the air opening area is enlarged. Accordingly, it provides effective combustion characteristics for a burner employing mixed gas of anode off-gas containing hydrogen gas and hydrocarbon-based fuel such as town gas as fuel.

International Publication No. 2013/161179 discloses a burner in which fuel is vertically ejected from a fuel aperture provided in the center of the bottom surface of the burner and air is ejected horizontally from multiple air apertures equally spaced on the circumference of the side wall of the burner such that the air encloses the flow of fuel, as shown in FIG. 13.

In the burner disclosed in International Publication No. 2013/161179, the fuel aperture is positioned below the lowest air apertures relative to the flame flowing direction. Accordingly, when fuel containing hydrogen gas and hydrocarbon gas such as town gas is ejected from the fuel aperture, a flame is formed at a point higher than the position at which the air and hydrogen gas collide and mix with each other even for hydrogen gas having a higher burning velocity. This can lower the possibility of phenomenons such as glowing of the bottom wall of the burner, improving the durability of the burner.

SUMMARY

However, the conventional examples do not fully consider the handling of thinning down of fuel caused by reduction of the concentration of a combustible component (for example, hydrogen gas) in the fuel for the burner.

For example, when the fuel utilization rate is increased in order to improve the power generation efficiency of a solid oxide fuel cell (hereinafter "SOFC"), anode off-gas used as the fuel for the burner tends to thin down. The fuel utilization rate refers to the percentage (%) of combustible components in fuel gas available for power generation that is actually utilized for power generation by a fuel cell.

One non-limiting and exemplary embodiment provides a fuel cell system that can stabilize combustion in a burner compared to conventional techniques even when fuel for the burner thins down.

In one general aspect, the techniques disclosed here feature a fuel cell system including: a fuel cell that generates electrical power with oxidant and fuel; and a burner in which anode off-gas discharged from an anode of the fuel cell and cathode off-gas discharged from a cathode of the fuel cell burn. The burner includes anode off-gas apertures from which the anode off-gas is ejected, and first cathode off-gas apertures and second cathode off-gas apertures from which the cathode off-gas is ejected. In a cross section of the burner at a cutting plane that passes one of the first cathode off-gas apertures, one of the anode off-gas apertures, and one of the second cathode off-gas apertures that are aligned on a straight line when the burner is seen in plan view, the one of the first cathode off-gas apertures is provided on one of opposite sides of the one of the anode off-gas apertures such that a vector of an ejecting direction of the cathode off-gas from the one of the first cathode off-gas apertures forms a first acute angle with a vector of an ejecting direction of the anode off-gas from the one of the anode off-gas apertures, and the one of the second cathode off-gas apertures is provided on another of the opposite sides of the one of the anode off-gas apertures such that a vector of the ejecting direction of the cathode off-gas from the one of the second cathode off-gas apertures forms a second acute angle with the vector of the ejecting direction of the anode off-gas.

The fuel cell system according to the aspect of the present disclosure has the effect of stabilizing combustion in the burner compared to conventional techniques even when fuel for the burner thins down.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 shows an example of results of an experiment with the line-type combustion experimental device;

FIG. 9 shows an example of results of an experiment with the line-type combustion experimental device;

DETAILED DESCRIPTION

Figure 1:
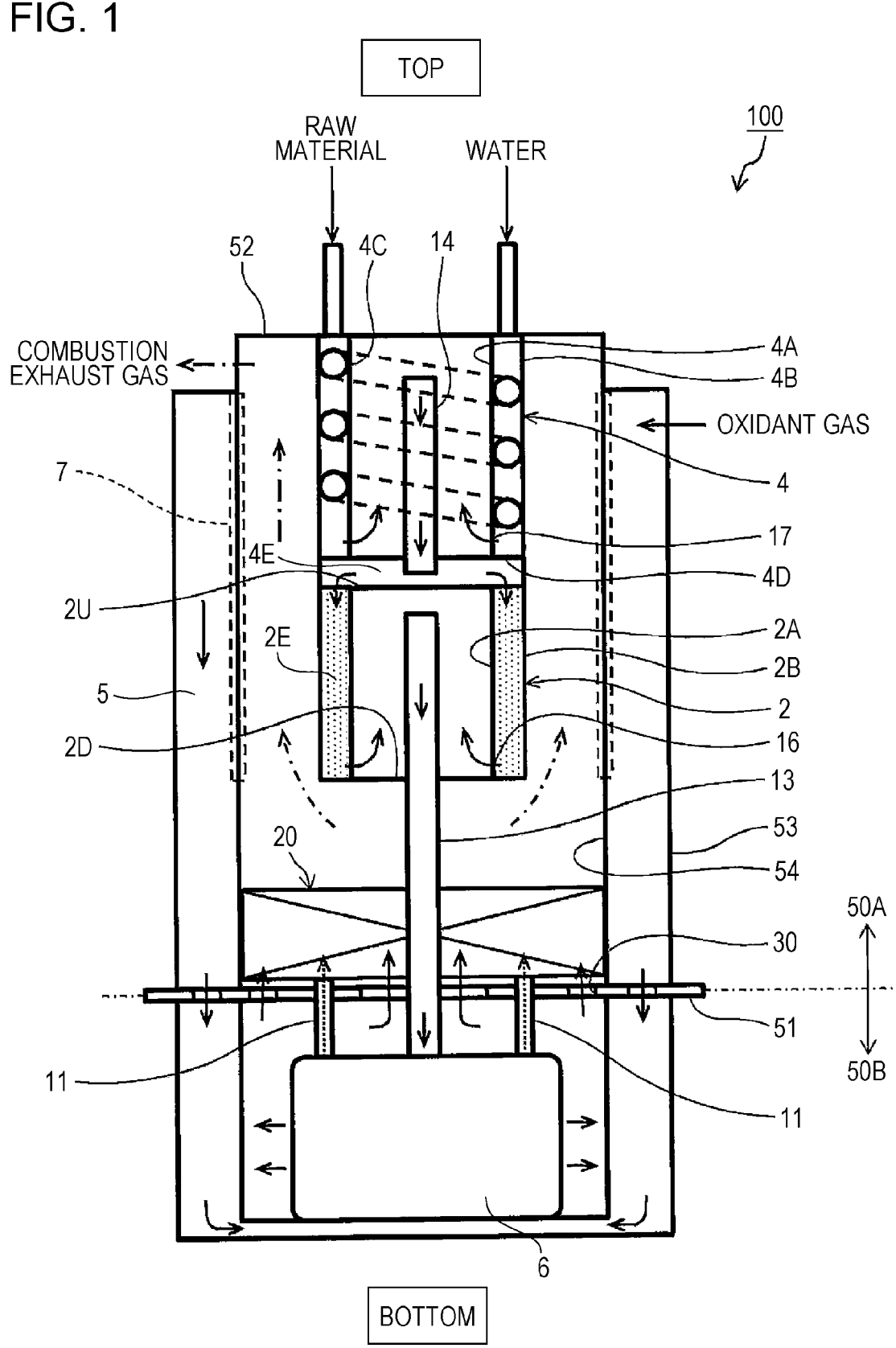
FIG. 1 shows an example of a fuel cell system according to an embodiment of the present disclosure.

At activation of a solid oxide fuel cell system (hereinafter "SOFC system"), for example, hydrocarbon gas such as town gas or propane gas is burned in a burner. When a reformer in a hot box has been heated to a predetermined appropriate temperature by the heat of combustion, reforming water is supplied to the reformer and hydrogen is generated via steam reforming reaction. When a fuel cell in the hot box has been heated to a predetermined appropriate temperature (for example, about 600° C. to 750° C.) by the heat of combustion, power generation is initiated via electrochemical reaction from hydrogen in reformed gas and oxygen in the air.

During power generation of the SOFC system, about 70% or more of hydrogen gas in the reformed gas is used for power generation in the anode of the fuel cell, changes to water, and then is discharged as anode off-gas with the remaining hydrogen gas of about 30%. In this process, part of oxygen in the air is used for power generation in the cathode of the fuel cell and discharged as cathode off-gas. In the burner, such anode off-gas and cathode off-gas are burned. The reformer and the fuel cell are thereby maintained at an appropriate temperature.

In the course of the operation of the SOFC system from activation to power generation as described above, hydrocarbon gas combustion which is high both in the calorific value and the required oxygen amount occurs in the burner during activation, hydrogen gas combustion which is low both in the calorific value and the required oxygen amount and having a low quantity of combustible components (hereinafter "lean hydrogen") occurs during power generation, and combustion of mixed gas of hydrocarbon gas and lean hydrogen occurs during the transient period between the two phases. Thus, the components of the fuel utilized for the burner change in the different operational phases of the SOFC system. The SOFC system accordingly needs to stabilize combustion in the burner even when the fuel components in the burner change with time. Although there has been a proposal of a method for selectively using multiple burners in accordance with change of the fuel components, the proposal is not practical as it incurs an increased manufacturing cost of the SOFC system.

As mentioned above, the fuel for the burner is lean hydrogen during power generation of the SOFC system. For example, as the fuel utilization rate (Uf) is increased for improving the power generation efficiency of the SOFC, the hydrogen gas component in anode off-gas decreases. In some cases, it is necessary to maintain lean hydrogen combustion in the burner in a state close to the limit of inflammability of hydrogen gas (generally assumed to be around 4%).

The disclosure described in Japanese Unexamined Patent Application Publication No. 2003-254514 (hereinafter the "first conventional example") and the disclosure described in International Publication No. 2013/161179 (hereinafter the "second conventional example") are directed to burners for solid polymer electrolyte fuel cells (PEFCs) and do not take into account combustion of lean hydrogen in a burner during power generation of an SOFC system. Thus, the burner designs of the first and second conventional examples should be reconsidered in order to appropriately handle such lean hydrogen combustion.

An issue associated with the burner of the first conventional example will be described first.

Figure 14:
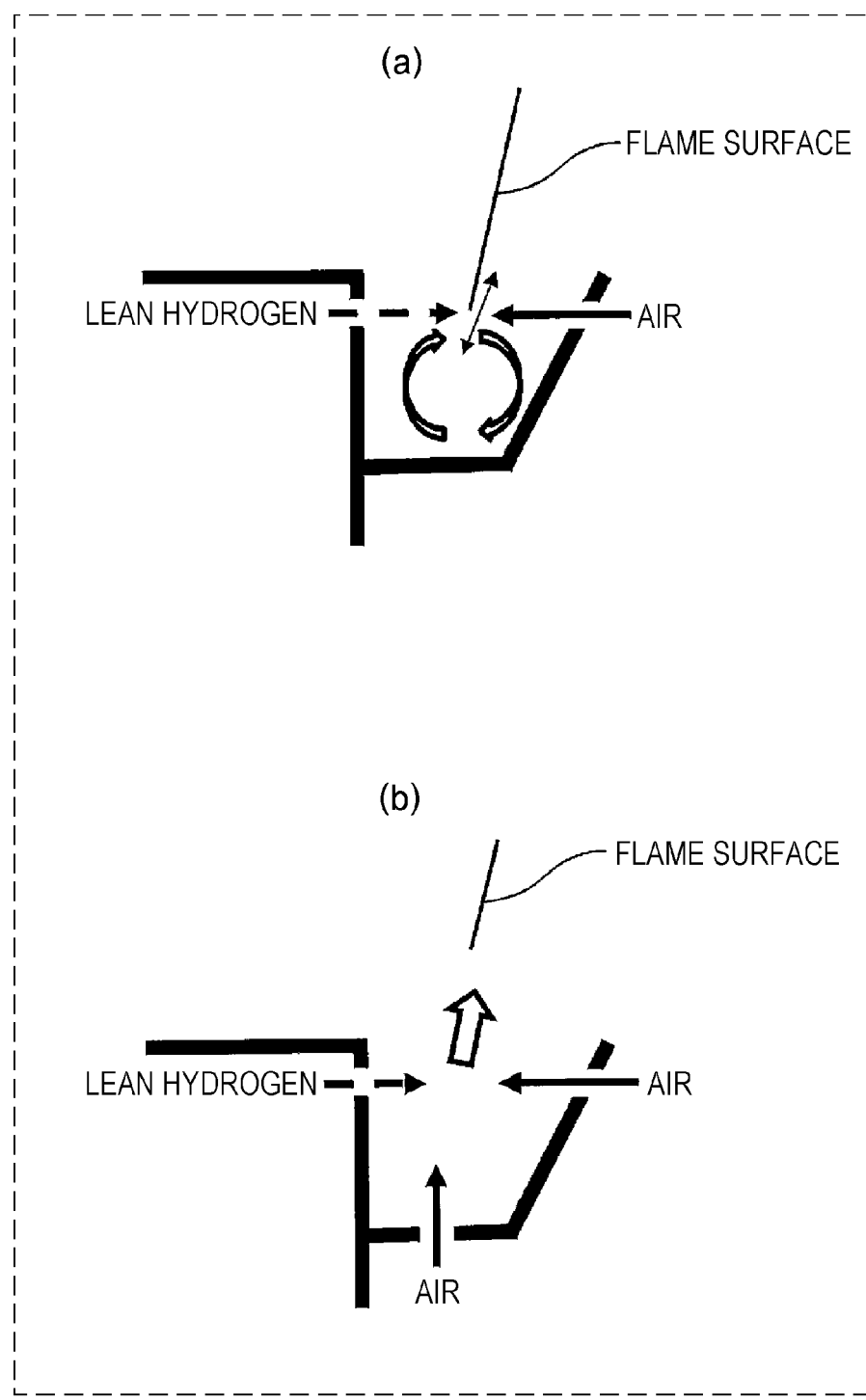
FIG. 14 schematically shows an example of a flame surface in lean hydrogen combustion with the burner of a conventional example.

FIG. 14 schematically shows an example of a flame surface in lean hydrogen combustion with the burner of the first conventional example. FIG. 14($a$) illustrates a flame surface for a case with no air aperture provided in the bottom wall of the burner. FIG. 14($b$) illustrates a flame surface for a case with an air aperture provided in the bottom wall of the burner.

In this conventional example, lean hydrogen (anode off-gas) ejected from a hydrogen aperture and air (cathode off-gas) ejected from the air aperture collide with each other head-on. Accordingly, an almost entire amount of the air is diffused in the flame region to cause further reduction in the concentration of the combustible component in the lean hydrogen; it would be difficult to maintain lean hydrogen combustion. In addition, after the collision of the two gas flows, a rounding phenomenon occurs as shown in FIG. 14($a$), where part of the mixed gas of lean hydrogen and air goes down. The mixed gas then passes through the flame surface again, which can lead to unstable combustion. Also, since the flame surface is formed above the point of collision, the burner does not provide a sufficient flame holding performance desired for lean hydrogen combustion. In the example shown in FIG. 14($b$), reduction in the flame holding performance of the burner is inevitable because the flame surface is formed at a further higher point than the flame surface in the burner of FIG. 14($a$) due to air from the air aperture in the bottom wall of the burner. Note that the burner of FIG. 14($b$) is a device developed for a situation in which fuel containing a sufficient combustible component is burned, intended to prevent reduction of the reliability of the structure caused by excessive rise of temperature rather than to hold flames.

An issue associated with the burner of the second conventional example will be described next.

Figure 15:
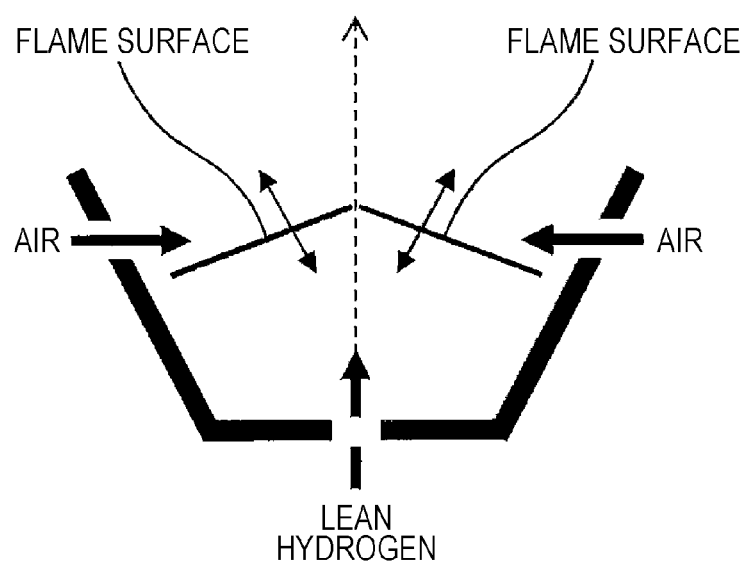
FIG. 15 schematically shows an example of flame surfaces in lean hydrogen combustion with the burner of another conventional example.

FIG. 15 schematically shows an example of flame surfaces in lean hydrogen combustion with the burner of the second conventional example.

This conventional example is also intended to prevent reduction of the reliability of the structure caused by excessive rise of temperature rather than to hold flames as with the first conventional example, and has the potential problem of the flame surface lifting from the hydrogen aperture, thus lacking flame holding performance and even leading to a misfire, if applied to lean hydrogen combustion without modification.

Also, as shown in FIG. 15, the flame surfaces oscillate at a higher air ratio, possibly making it difficult to maintain stable combustion. Such oscillation of flame surfaces has been confirmed in a visualized combustion experiment conducted with a line-type combustion experimental device as discussed below.

The present inventors have thus studied how to handle the thinning down of fuel caused by reduction of the concentration of a combustible component (for example, hydrogen gas) in the fuel for the burner and conceived an aspect of the present disclosure as follows.

A fuel cell system according to a first aspect of the present disclosure has been devised based on the foregoing findings. The fuel cell system includes a fuel cell that generates electrical power with oxidant and fuel; and a burner in which anode off-gas discharged from an anode of the fuel cell and cathode off-gas discharged from a cathode of the fuel cell burn, wherein:

the burner includes anode off-gas apertures from which the anode off-gas is ejected, and first cathode off-gas apertures and second cathode off-gas apertures from which the cathode off-gas is ejected, and in a cross section of the burner at a cutting plane that passes one of the first cathode off-gas apertures, one of the anode off-gas apertures, and one of the second cathode off-gas apertures that are aligned on a straight line when the burner is seen in plan view, the one of the first cathode off-gas apertures is provided on one of opposite sides of the one of the anode off-gas apertures such that a vector of an ejecting direction of the cathode off-gas from the one of the first cathode off-gas apertures forms a first acute angle with a vector of an ejecting direction of the anode off-gas from the one of the anode off-gas apertures, and the one of the second cathode off-gas apertures is provided on another of the opposite sides of the one of the anode off-gas apertures such that a vector of the ejecting direction of the cathode off-gas from the one of the second cathode off-gas apertures forms a second acute angle with the vector of the ejecting direction of the anode off-gas.

The fuel cell system according to a second aspect of the present disclosure is the fuel cell system according to the first aspect, in which the first acute angle and the second acute angle may be 45° or more and 70° or less.

With this configuration, the fuel cell system according to this aspect can stabilize combustion in the burner compared to conventional techniques even when fuel for the burner thins down.

For example, in contrast to the first conventional example in which anode off-gas and cathode off-gas collide with one another head-on, part of cathode off-gas diffuses diagonally upward after passing through the flame region due to setting of the first acute angle and the second acute angle at 45° or more and 70° or less. Thus, further reduction of the concentration of combustible components in lean hydrogen can be suppressed.

Also, as cathode off-gas collides with anode off-gas diagonally from underneath so as to enclose the anode off-gas, the mixed gas of the two diffuses upward smoothly. Thus, a rounding phenomenon as in the first conventional example and combustion oscillation as in the second conventional example are suppressed, reducing the possibility of unstable combustion.

Also, in the fuel cell system according to this aspect, by setting the ejection velocity of the anode off-gas in a desired range, stagnant regions in which the flow velocities of anode off-gas and cathode off-gas are nearly zero occur in the vicinity of a wall portion of the burner between the anode off-gas apertures and the first cathode off-gas apertures and in the vicinity of a wall portion of the burner between the anode off-gas apertures and the second cathode off-gas apertures. Due to the presence of the stagnant regions, a flame surface extends downwards to attach to the wall portion of the burner (hereinafter sometimes abbreviated as "attachment of the flame surface"). This can improve the flame holding performance of the burner compared to the cases of the first and second conventional examples. Thus, a promoted combustion chemical reaction of the fuel can stabilize combustion even in lean hydrogen combustion. The presence of the stagnant regions has been confirmed through visualization of gas flow velocity distribution with a fluid simulation as discussed below. The attachment of the flame surface has been confirmed through visualized combustion experiments with a line-type combustion experimental device as discussed below.

The fuel cell system according to a third aspect of the present disclosure is the fuel cell system according to the second aspect, in which the first acute angle and the second acute angle may be 45°.

With this configuration, by setting the first acute angle and the second acute angle at 45°, both lean hydrogen combustion and hydrocarbon gas combustion in the burner can be stabilized. This has been confirmed through visualized combustion experiments with the line-type combustion experimental device as discussed below.

The fuel cell system according to a fourth aspect of the present disclosure is the fuel cell system according to any one of the first to third aspect, in which the first acute angle and the second acute angle may be equal to each other.

The fuel cell system according to a fifth aspect of the present disclosure is the fuel cell system according to the first aspect, in which the burner may include third cathode off-gas apertures and fourth cathode off-gas apertures from which the cathode off-gas is ejected, and in a cross section of the burner at a cutting plane that passes one of the third cathode off-gas apertures, one of the first cathode off-gas apertures, one of the anode off-gas apertures, one of the second cathode off-gas apertures, and one of the fourth cathode off-gas apertures that are aligned on a straight line when the burner is seen in plan view, the one of the third cathode off-gas apertures may be provided on one of the opposite sides of the one of the anode off-gas apertures above the one of the first cathode off-gas apertures such that a vector of the ejecting direction of the cathode off-gas from the one of the third cathode off-gas apertures forms a third acute angle with the vector of the ejecting direction of the anode off-gas, the one of the fourth cathode off-gas apertures may be provided on the other of the opposite sides of the one of the anode off-gas apertures above the one of the second cathode off-gas apertures such that a vector of the ejecting direction of the cathode off-gas from the one of the fourth cathode off-gas apertures forms a fourth acute angle with the vector of the ejecting direction of the anode off-gas, and the third acute angle and the fourth acute angle may be different from the first acute angle and the second acute angle.

The fuel cell system according to a sixth aspect of the present disclosure is the fuel cell system according to the fifth aspect, in which the third acute angle and the fourth acute angle may be larger than the first acute angle and the second acute angle.

The fuel cell system according to a seventh aspect of the present disclosure is the fuel cell system according to the sixth aspect, in which the first acute angle and the second acute angle may be 45°, and the third acute angle and the fourth acute angle may be 70°.

With these configurations, in the fuel cell system according to these aspects, a single burner can handle both lean hydrogen combustion with a low calorific value and hydrocarbon gas combustion with a high calorific value.

For example, by setting the first acute angle and the second acute angle at 45° and the third acute angle and the fourth acute angle at 70°, both lean hydrogen combustion and hydrocarbon gas combustion in the burner can be stabilized. It can also optimize hydrocarbon gas combustion with a high calorific value. This has been confirmed through visualized combustion experiments with the line-type combustion experimental device as discussed below.

The fuel cell system according to a eighth aspect of the present disclosure is the fuel cell system according to any one of the fifth to seventh aspects, in which a sum of a total opening area of the third cathode off-gas apertures and a total opening area of the fourth cathode off-gas apertures may be greater than a sum of a total opening area of the first cathode off-gas apertures and a total opening area of the second cathode off-gas apertures.

With this configuration, in the fuel cell system according to this aspect, the amount of cathode off-gas ejected from the third cathode off-gas apertures and the fourth cathode off-gas apertures can be made larger than the amount of cathode off-gas ejected from the first cathode off-gas apertures and the second cathode off-gas apertures. This can secure a sufficient amount of cathode off-gas in hydrocarbon gas combustion by the burner in a case where the single burner handles both lean hydrogen combustion and hydrocarbon gas combustion. At the same time, cathode off-gas ejected from the third cathode off-gas apertures and the fourth cathode off-gas apertures bypasses the combustion region during lean hydrogen combustion, which produces short flames, thus resulting in an appropriate air ratio for lean hydrogen combustion.

The fuel cell system according to a ninth aspect of the present disclosure is the fuel cell system according to any one of the first to eighth aspects, in which a first minimum distance between the anode off-gas apertures and the first cathode off-gas apertures and a second minimum distance between the anode off-gas apertures and the second cathode off-gas apertures may be from 5 mm or more to 10 mm or less.

The fuel cell system according to a tenth aspect of the present disclosure is the fuel cell system according to the ninth aspect, in which the first minimum distance and the second minimum distance may be equal to each other.

With this configuration, the fuel cell system according to this aspect can keep combustion in the burner stabilized by setting the first minimum distance and the second minimum distance in the desired range.

For example, when the first minimum distance and the second minimum distance are less than 5 mm, there are the possibility of the flame in the burner blowing out and the possibility of the flame failing to move to the neighboring anode off-gas apertures. The fuel cell system according to this aspect can reduce these possibilities with the configuration described above. When the first minimum distance and the second minimum distance exceed 10 mm, for example, the flame holding performance of the burner could degrade due to extinction of the stagnant regions described above. The fuel cell system according to this aspect can reduce such a possibility as well with the configuration described above.

The fuel cell system according to an eleventh aspect of the present disclosure is the fuel cell system according to any one of the first to tenth aspects, in which the burner may include an annular anode off-gas wall surface having the anode off-gas apertures, the anode off-gas apertures being formed at a predetermined interval in a circumferential direction of the annular anode off-gas wall surface, an annular first cathode off-gas wall surface having the first cathode off-gas apertures, the first cathode off-gas apertures being formed at predetermined a interval in a circumferential direction, and an annular second cathode off-gas wall surface having the second cathode off-gas apertures, the second cathode off-gas apertures formed at a predetermined interval in a circumferential direction.

This configuration enables appropriate dispersion of anode off-gas when the anode off-gas flows into a combustion space from the anode off-gas apertures. It also enables appropriate dispersion of cathode off-gas when the cathode off-gas flows into the combustion space from the first cathode off-gas apertures and the second cathode off-gas apertures.

The fuel cell system according to an twelfth aspect of the present disclosure is the fuel cell system according to the eleventh aspect, in which the vector of the ejecting direction of the anode off-gas may be directed toward a central axis of the burner.

The fuel cell system according to a thirteenth aspect of the present disclosure is the fuel cell system according to the twelfth aspect, in which an angle formed by the vector of the ejecting direction of the anode off-gas and a vector of the central axis of the burner may be from 30° or more to 70° or less.

With this configuration, by setting the angle formed in the predetermined range (30°≤the angle formed≤70°), the fuel cell system according to this aspect can suppress excessive temperature rise of the wall portion of the burner due to flames and also permits reduction in the size of the burner.

For example, when the angle formed is less than 30°, the temperature of the wall portion of the burner can excessively rise due to flames. The fuel cell system according to this aspect can reduce such a possibility with the configuration described above. When the angle formed exceeds 70°, for example, the burner can be large-sized. The fuel cell system according to this aspect can reduce such a possibility with the configuration described above.

An embodiment of the present disclosure will be now described with reference to accompanying drawings. The embodiment described below shows a specific example of the present disclosure. Thus, the numerical values, geometries, materials, components, arrangement positions and connections of the components shown in the following embodiment are merely examples and are not intended to limit the present disclosure. Any component in the following embodiment that is not described in an independent claim, which represents the highest concept of the present disclosure, will be described as an optional component. In the drawings, description on elements denoted by the same reference characters may be omitted. The drawings schematically illustrate individual components for ease of understanding and may not be correct indication of geometries or dimensional scale.

Embodiment

[Overall Device Configuration]

FIG. 1 shows an example of a fuel cell system according to an embodiment of the present disclosure.

Although a solid oxide fuel cell system (hereinafter "SOFC system 100") having a solid oxide fuel cell (hereinafter "SOFC 6") in a generator unit will be described as a specific example of the fuel cell system, the present disclosure is not limited thereto. The fuel cell system can be of any configuration as long as it is operable at high temperatures (for example, 600° C. or higher). For example, a fuel cell system operable at such high temperatures may be a molten carbonate fuel cell system having a molten carbonate fuel cell (MCFC) in the generator unit, in addition to the SOFC system 100 described below.

In FIG. 1 (as well as in other drawings), "top" and "bottom" are defined as indicated in the drawing for the sake of convenience, and the gravity is assumed to act from top to bottom.

In the example shown in FIG. 1, the SOFC system 100 includes a reformer 2, an evaporator 4, an oxidant gas supply channel 5, an SOFC 6, an oxidant gas heat exchanger 7, anode off-gas discharge channels 11, a reformed gas supply channel 13, a mixed gas supply channel 14, and a burner 20.

The SOFC system 100 of this embodiment has a partition wall portion 51 that divides the interior of SOFC system 100 into an upper section 50A in which the reformer 2, the evaporator 4, the burner 20, and the like are housed and a lower section 50B in which the SOFC 6 and the like is housed.

The reformer 2 reforms hydrocarbon-based raw material to produce reformed gas containing hydrogen. In the SOFC system 100 of this embodiment, the reformer 2 is positioned above the burner 20 and has a side wall portion formed of an inner wall 2A and an outer wall 2B, although it may not necessarily have a side wall portion defining a space in the reformer 2.

By providing the reformer 2 with a side wall portion and designing an appropriate thickness of the side wall portion, however, heat of combustion exhaust gas is easier to be transferred to an entire reforming catalyst 2E in the side wall portion of the reformer 2.

More specifically, by providing the reforming catalyst 2E in the side wall portion of the reformer 2 and with preparation of an appropriate amount of the reforming catalyst 2E, the SOFC system 100 can be configured so that the heat of combustion exhaust gas is sufficiently transferred to the entire reforming catalyst 2E. In the SOFC system 100 of this embodiment, with a required amount of reforming catalyst (for example, about 200 g) prepared in the reformer 2, for example, the interval between the inner wall 2A and the outer wall 2B (that is, the thickness of the side wall portion) is set at around 10 mm so that heat is sufficiently transferred from combustion exhaust gas to the entire reforming catalyst 2E. These specific details of the reformer 2 are exemplary and are not limited to the present example.

Although the inner wall 2A and the outer wall 2B of the reformer 2 are cylinders in the SOFC system 100 of this embodiment, the present disclosure is not limited thereto; the inner wall 2A and the outer wall 2B may instead be rectangular tubes, for example.

When the inner wall 2A and the outer wall 2B of the reformer 2 are cylinders as in the SOFC system 100 of this embodiment, however, the length and the area of welding during manufacture and hence the manufacturing cost of the reformer 2 can be reduced compared to when they are rectangular tubes. It also improves resistance to gas pressure and heat stress and permits a reduced thickness of the cylinders. These allow reduction of the cost of the SOFC system 100.

In the SOFC system 100 of this embodiment, an upper end region of the side wall portion of the reformer 2 is covered with an upper plate member 2U and a lower end region of the side wall portion is covered with a lower plate member 2D. In a periphery of the upper plate member 2U, multiple openings (not shown) are formed through which gas to be fed to the reforming catalyst 2E passes.

As shown in FIG. 1, combustion exhaust gas at a high temperature passes through the space between the outer wall 2B of the reformer 2 and an inner wall 54 of a vessel of the SOFC system 100. This results in the reforming catalyst 2E in the reformer 2 being heated by the heat of the combustion exhaust gas. Details of the burner 20, which produces such combustion exhaust gas, will be described later.

A turnback portion 16 is provided near the lower end of the inner wall 2A of the reformer 2. The turnback portion 16 has multiple openings (not shown) formed therein along the circumference of the inner wall 2A. These openings are formed in the inner wall 2A with a size that blocks passage of catalyst particles of the reforming catalyst but allows passage of reformed gas (for example, round holes with a diameter of about 1 to 3 mm).

The reformed gas supply channel 13 airtightly penetrates the lower plate member 2D and extends vertically upward in the space within the reformer 2. The upper end of the reformed gas supply channel 13 lies at a position that does not block entry of reformed gas from the space in the reformer 2 to the reformed gas supply channel 13 and is lower than the upper plate member 2U. The lower end of the reformed gas supply channel 13 is connected to the SOFC 6.

The reforming reaction of the reformer 2 can be in any form. Examples of reforming reaction may include steam reforming reaction, auto-thermal reaction, and partial oxidation reaction, for instance. For the catalyst metal for the reforming catalyst, at least one selected from the group consisting of a noble metal catalyst, such as Pt, Ru, or Rh, and Ni may be generally used. Although not shown in FIG. 1, equipment required for the above-listed reforming reactions are included as appropriate. For example, for steam reforming reaction, a water feeder (for example, a pump) for supplying water to the evaporator 4 or the like would be included. For auto-thermal reaction, the SOFC system 100 would further include an air feeder (for example, a blower) for supplying air to the reformer 2, for example.

For the raw material to be fed to the reformer 2, hydrocarbon-based fuel gas containing an organic compound made at least from carbon and hydrogen, such as town gas containing methane as the primary component, natural gas, or LPG, may be used, or hydrocarbon-based liquid fuel, such as alcohol, bio-fuel, or light oil, may be used.

In the SOFC system 100 of this embodiment, steam reforming reaction takes place as the reforming reaction in the reformer 2. Accordingly, the evaporator 4 is provided immediately above the upper plate member 2U of the reformer 2.

The evaporator 4 has a side wall portion formed of an inner wall 4A and an outer wall 4B, and a bottom 4E formed of the upper plate member 2U of the reformer 2 and a lower plate member 4D. An upper end region of the side wall portion of the evaporator 4 is covered with an upper wall 52 of the vessel of the SOFC system 100, and the lower end region of the side wall portion is covered with the lower plate member 4D. Thus, the interiors of the side wall portion and the bottom 4E of the evaporator 4 are both spaces. In the side wall portion, a flow channel member 4C (for example, wire) forming a spiral flow channel is wound.

The outer wall 4B of the evaporator 4 and the outer wall 2B of the reformer 2 are formed by one same tube. This can decrease the number of components of the SOFC system 100.

Although the inner wall 4A and outer wall 4B of the evaporator 4 are cylinders in the SOFC system 100 of this embodiment, the present disclosure is not limited thereto; the inner wall 4A and outer wall 4B may instead be rectangular tubes, for example.

When the inner wall 4A and the outer wall 4B of the evaporator 4 are cylinders as in the SOFC system 100 of this embodiment, however, the length and area of welding during manufacture and hence the manufacturing cost of the evaporator 4 can be reduced compared to when they are rectangular tubes. It also improves resistance to gas pressure and heat stress and permits a reduced thickness of the cylinders. These allow reduction of the cost of the SOFC system 100.

As shown in FIG. 1, combustion exhaust gas at a high temperature passes through the space between the outer wall 4B of the evaporator 4 and the inner wall 54 of the vessel of the SOFC system 100. This results in the interior of the side wall portion of the evaporator 4 being heated by the heat of the combustion exhaust gas.

A turnback portion 17 is provided near the lower end of the inner wall 4A of the evaporator 4. The turnback portion 17 has multiple openings (not shown) formed therein along the circumference of the inner wall 4A. The mixed gas supply channel 14, in which the mixed gas of raw material and water vapor flows, airtightly penetrates the lower plate member 4D and extends vertically upward in the space within the evaporator 4. The upper end of the mixed gas supply channel 14 lies at a position that does not block entry of the mixed gas from the space in the evaporator 4 to the mixed gas supply channel 14 and is lower than the upper wall 52. The lower end of the mixed gas supply channel 14 lies at a position that does not block entry of mixed gas from the space in the bottom 4E of the evaporator 4 to the reforming catalyst 2E and is higher than the upper plate member 2U.

The evaporator 4 may be of any configuration as long as it is positioned in contact with the reformer 2. For example, the evaporator 4 and the reformer 2 may be arranged in this order in the top-to-bottom direction and the side wall portion of the evaporator 4 and the side wall portion of the reformer 2 may be in contact with each other via the bottom 4E of the evaporator 4 as in the SOFC system 100 of this embodiment, or the side wall portion of the evaporator and the side wall portion of the reformer may be joined at a desired interval in the vertical direction using a vertical member not illustrated so that the two side wall portions are in contact with each other.

By thus positioning the evaporator 4 and reformer 2 in contact with each other, the configuration of the SOFC system 100 is simplified. That is, by integrally arranging the evaporator 4 and the reformer 2 in line along the vertical direction, the SOFC system 100 can be of a simple configuration compared when the evaporator and the reformer are separately provided, for example.

The SOFC 6 generates electrical power with oxidant and fuel. Specifically, the cathode of the SOFC 6 is supplied with oxidant gas through the oxidant gas supply channel 5 and the anode of the SOFC 6 is supplied with reformed gas through the reformed gas supply channel 13. In the SOFC 6, a set of multiple individual cells of the SOFC 6 (not shown) are connected in series, for example. The SOFC 6 may be formed of a stack of multiple plate-shaped individual cells or a set of multiple cylindrical individual cells. In this embodiment, the SOFC 6 is formed of a planar stack including planar individual cells and other components such as interconnectors. The SOFC system 100 also includes equipment such as a temperature detector (not shown) for detecting the operational temperature of the SOFC 6 (for example, 600° C. or higher) and an electrode (not shown) for drawing generated current from the SOFC 6. As the configuration of the SOFC 6 is similar to a general SOFC, detailed description on the same is omitted.

The oxidant gas supply channel 5 is a flow channel in which oxidant gas to be fed to the cathode of the SOFC 6 flows. Specifically, oxidant gas is supplied to the oxidant gas supply channel 5 by an oxidant gas feeder not illustrated (for example, a blower) and then fed to the SOFC 6. The oxidant gas may be air, for example.

The oxidant gas supply channel 5 is formed between the inner wall 54 and an outer wall 53 of the vessel of the SOFC system 100, the inner wall 54 extending from the upper wall 52 of the vessel of the SOFC system 100 to below the SOFC 6 and covering the bottom of the SOFC 6. As the SOFC system 100 operates at high temperatures (for example, 600° C. or higher), the vessel of the SOFC system 100 is typically covered with insulating material not illustrated so that heat dissipation to the outside is suppressed.

The anode off-gas discharge channels 11 are flow channels in which anode off-gas discharged from the anode of the SOFC 6 flows. Specifically, reformed gas (anode off-gas) that was not used for power generation of the SOFC 6 flows into and passes through the anode off-gas discharge channels 11, and then is fed to the burner 20. In the SOFC system 100 of this embodiment, the anode off-gas discharge channels 11 extend from the anode of the SOFC 6 through the lower section 50B and the partition wall portion 51 to reach an anode off-gas ejector 22 (see FIG. 3) of the burner 20. Although there are two anode off-gas discharge channels 11 in the illustrated example, the number is not limited to two. The configuration of the anode off-gas ejector 22 of the burner 20 will be described in greater detail later.

The cathode off-gas discharge channel is a flow channel in which cathode off-gas discharged from the cathode of the SOFC 6 flows. Specifically, oxidant gas (cathode off-gas) that was not used for power generation of the SOFC 6 passes through this cathode off-gas discharge channel and then is fed to cathode off-gas ejectors 21, 23, 24 of the burner 20 (see FIG. 3). The configuration of the cathode off-gas ejectors 21, 23, 24 of the burner 20 will be described in greater detail later.

In the SOFC system 100 of this embodiment, the cathode off-gas discharge channel is formed by the space between an outer shell of the SOFC 6 and the inner wall 54 and by the space between the outer shell of the SOFC 6 and the partition wall portion 51.

The reformed gas supply channel 13 extends from the reformer 2 through the burner 20 to reach the SOFC 6.

In the oxidant gas heat exchanger 7, heat is exchanged between the oxidant gas flowing in the oxidant gas supply channel 5 and the combustion exhaust gas flowing in the inner wall 54. That is, in the oxidant gas heat exchanger 7, a portion of the inner wall 54 that is exposed to combustion exhaust gas functions as a heat transfer surface. As a result, when oxidant gas (air) at a normal temperature flows from top to bottom in the oxidant gas supply channel 5, it is heated to a high temperature (for example, about 600° C. to 700° C.) via heat exchange with the combustion exhaust gas flowing from bottom to top in the inner wall 54. The oxidant gas is further heated to a temperature necessary for the power generation reaction of the SOFC 6 utilizing the reaction heat of internal reforming in the SOFC 6, and supplied to the cathode of the SOFC 6 from the lower portion of the vessel housing the SOFC 6. The combustion exhaust gas is cooled to an appropriate temperature (for example, about 100° C. to 200° C.) and then discharged outside the SOFC system 100 to be fed to a heat exchanger not illustrated for generating warm water for hot water supply, for example.

[Configuration of Burner 20]

The configuration of the burner 20 in the SOFC system 100 according to the embodiment will be described in detail with reference to drawings.

Figure 2:
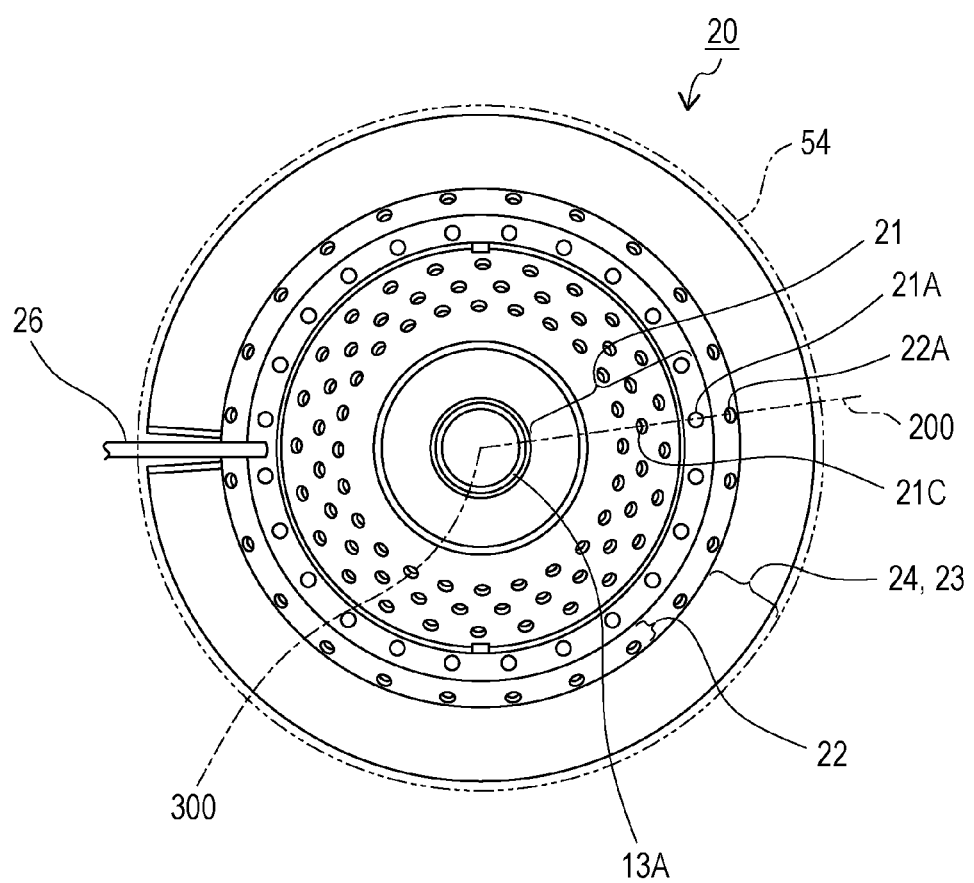
FIG. 2 shows an example of a burner of the fuel cell system according to the embodiment.
Figure 3:
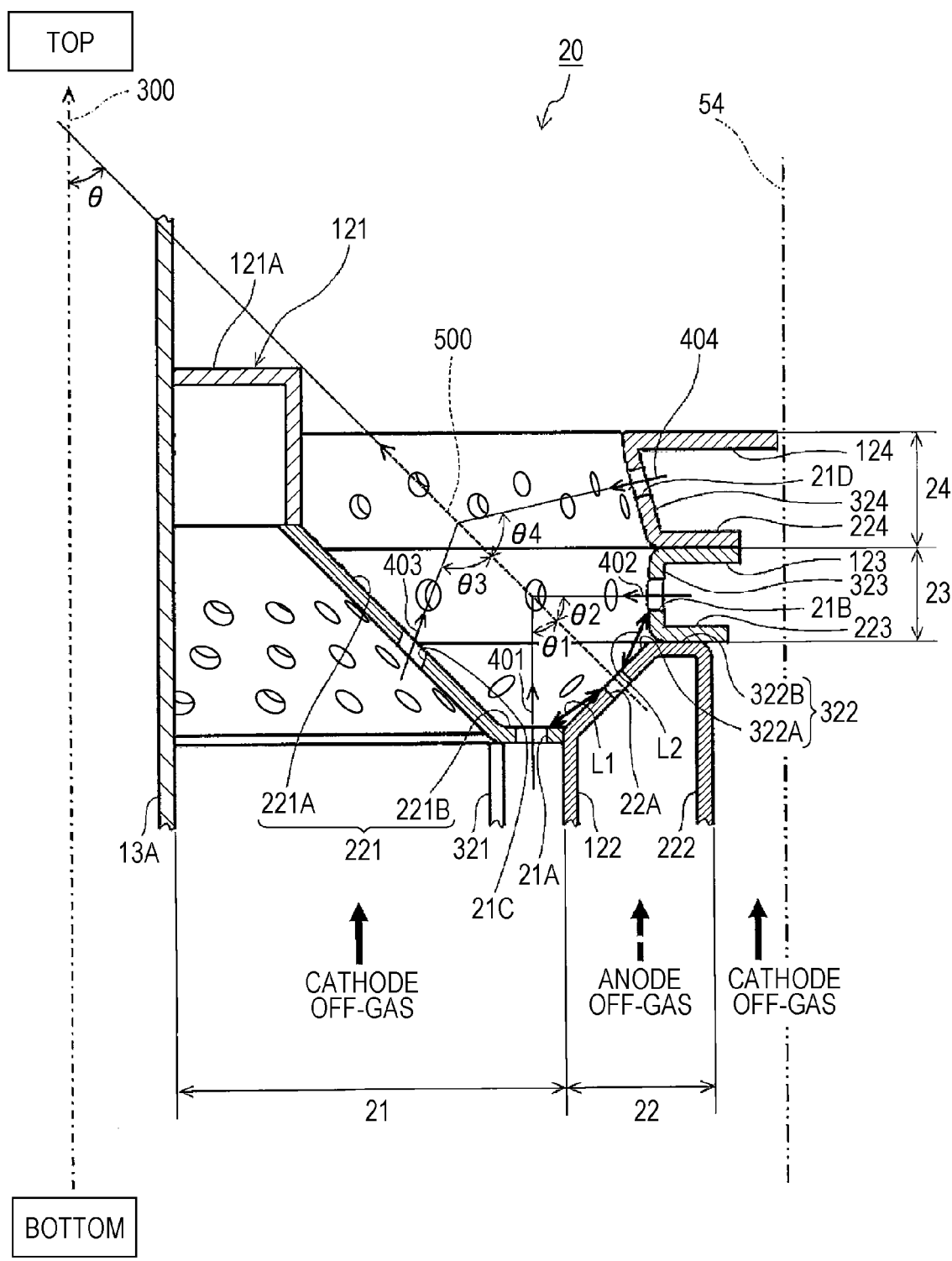
FIG. 3 shows an example of the burner of the fuel cell system according to the embodiment.

FIGS. 2 and 3 show an example of the burner of the fuel cell system according to the embodiment.

FIG. 2 illustrates the burner 20 as seen from above in plan view. FIG. 3 illustrates a cross section of the burner 20 taken along a straight line 200 in FIG. 2.

The burner 20 includes the cathode off-gas ejector 21, the anode off-gas ejector 22, the cathode off-gas ejector 23, the cathode off-gas ejector 24, and an igniter 26.

The burner 20 is a device for heating the reformer 2. More specifically, the burner 20 forms flames along a vector 500 of the ejecting direction of anode off-gas by mixing and burning of anode off-gas and cathode off-gas in the burner 20. High-temperature combustion exhaust gas from the burner 20 can then heat the reformer 2 provided above the burner 20. The igniter 26 is a device for firing the burner 20. The igniter 26 may be a heater or an ignition plug, for example.

[Definition of Parameters for Burner 20]

In the burner 20, various design parameters and operational parameters have significant effect on the combustion performance in the burner 20. Thus, such parameters will be defined together with reference the burner 20 of FIG. 3 and a line-type combustion experimental device 120 of FIG. 4.

<Design Parameters>

First acute angle θ1: the angle formed by a vector 401 of the ejecting direction of cathode off-gas and the vector 500 of the ejecting direction of anode off-gas (corresponding to the inclination angle θ1 of the line-type combustion experimental device 120)

Second acute angle θ2: the angle formed by a vector 402 of the ejecting direction of cathode off-gas and the vector 500 of the ejecting direction of anode off-gas (corresponding to the inclination angle θ2 of the line-type combustion experimental device 120)

Third acute angle θ3: the angle formed by a vector 403 of the ejecting direction of cathode off-gas and the vector 500 of the ejecting direction of anode off-gas Fourth acute angle θ4: the angle formed by a vector 404 of the ejecting direction of cathode off-gas and the vector 500 of the ejecting direction of anode off-gas Angle θ: the angle formed by the vector 500 of the ejecting direction of anode off-gas and the vector of a central axis 300 of the burner 20

First minimum distance L1: the minimum distance between anode off-gas apertures 22A and first cathode off-gas apertures 21A (corresponding to the distance $L_1$ of the line-type combustion experimental device 120)

Second minimum distance L2: the minimum distance between the anode off-gas apertures 22A and second cathode off-gas apertures 21B (corresponding to the distance $L_2$ of the line-type combustion experimental device 120)

<Operational Parameters>

Ejection velocity U: the ejection velocity of fuel (for example, anode off-gas) under standard conditions (temperature 0° C., 1 atmospheric pressure)

Total air ratio λ: the air ratio of cathode off-gas ejected from all of the cathode off-gas apertures of the burner 20

Local air ratio λ1: exemplified for the burner 20 of FIGS. 2 and 3, the air ratio of cathode off-gas ejected from the first cathode off-gas apertures 21A and the second cathode off-gas apertures 21B neighboring the anode off-gas apertures 22A on the opposite sides

[Detailed Configuration of Burner 20]

The detailed configurations of the anode off-gas ejector 22, the cathode off-gas ejector 21, the cathode off-gas ejector 23, and the cathode off-gas ejector 24 of the burner 20 will be described in sequence.

<Anode Off-Gas Ejector 22>

As shown in FIG. 2, in plan view, the anode off-gas ejector 22 is formed of an annular member surrounding the cathode off-gas ejector 21 and centered at the central axis 300.

More specifically, as shown in FIG. 3, the anode off-gas ejector 22 includes a cylindrical inner wall 122, a cylindrical outer wall 222, and an upper wall 322. The cylindrical inner wall 122 and the cylindrical outer wall 222 are positioned coaxially about the central axis 300, and the space between the cylindrical inner wall 122 and the cylindrical outer wall 222 defines an anode off-gas passage region communicating with the anode off-gas discharge channels 11 (see FIG. 1). The circular upper end of the cylindrical outer wall 222 extends above the circular upper end of the cylindrical inner wall 122. The circular inner end of the upper wall 322 is connected with the circular upper end of the cylindrical inner wall 122. The circular outer end of the upper wall 322 is connected with the circular upper end of the cylindrical outer wall 222. Accordingly, the upper wall 322 has an annular inclined portion 322A inclined upwardly from the circular inner end of the upper wall 322 outwardly, and an annular flat portion 322B extending from the inclined portion 322A horizontally.

At appropriate points of the inclined portion 322A of the upper wall 322, the anode off-gas apertures 22A from which anode off-gas is ejected are provided. Details of the arrangement position, geometries, dimensions, and the number of the anode off-gas apertures 22A will be described later.

Thus, anode off-gas passing through the anode off-gas discharge channels 11 (see FIG. 1) and diffusing upward is ejected into the combustion space from the anode off-gas apertures 22A of the anode off-gas ejector 22.

<Cathode Off-Gas Ejector 21>

As shown in FIG. 2, in plan view, the cathode off-gas ejector 21 is formed of an annular member surrounding a reformed gas supply pipe 13A, which forms the reformed gas supply channel 13, and centered at the central axis 300.

Specifically, as shown in FIG. 3, the cathode off-gas ejector 21 includes a covered cylindrical member 121, a flanged truncated cone member 221, and a cylindrical member 321. An opening for inserting the reformed gas supply pipe 13A is formed in the center of a circular upper lid 121A of the cylindrical member 121. That is, the reformed gas supply pipe 13A airtightly penetrates the center of the upper lid 121A in the vertical direction.

The cylindrical member 121, the truncated cone member 221, and the cylindrical member 321 are positioned in this order coaxially about the central axis 300 so that they are arrayed from top to bottom along the central axis 300 of the burner 20. The circular lower end of the cylindrical member 121 is connected with the circular upper end of the conical inclined portion 221A. The circular lower end of the conical inclined portion 221A (the base of an annular flange 221B) is connected with the circular upper end of the cylindrical member 321. The annular flange 221B extends horizontally from the base, and the tip of the annular flange 221B is connected with the anode off-gas ejector 22. That is, the tip of the annular flange 221B lies in the vicinity of the circular upper end of the cylindrical inner wall 122 of the anode off-gas ejector 22.

The diameter of the lower cylindrical member 321 is larger than the diameter of the upper cylindrical member 121. Accordingly, the conical inclined portion 221A of the truncated cone member 221 has a shape of an umbrella inclined downwardly from the inner side to the outer side and having a center opening formed in it.

At appropriate points of the annular flange 221B, the first cathode off-gas apertures 21A from which cathode off-gas is ejected are provided on one of the opposite sides of the anode off-gas apertures 22A such that the vector 401 of the ejecting direction of cathode off-gas forms the first acute angle θ1 with the vector 500 of the ejecting direction of anode off-gas. The anode off-gas apertures 22A are spaced from the first cathode off-gas apertures 21A by the first minimum distance L1.

At appropriate points of the conical inclined portion 221A, the third cathode off-gas apertures 21C from which the cathode off-gas is ejected are provided on one of the opposite sides of the anode off-gas apertures 22A above the first cathode off-gas apertures 21A such that the vector 403 of the ejecting direction of cathode off-gas forms the third acute angle θ3 with the vector 500 of the ejecting direction of anode off-gas.

Details of the arrangement position, geometries, dimensions, and the number of the first cathode off-gas apertures 21A and the third cathode off-gas apertures 21C will be described later.

Thus, cathode off-gas passing through the center opening in the partition wall portion 51 (see FIG. 1) and diffusing upwardly is ejected into the combustion space from the first cathode off-gas apertures 21A and the third cathode off-gas apertures 21C of the cathode off-gas ejector 21. In other words, the cathode off-gas ejector 21 and the anode off-gas ejector 22 have the functions of mixing and burning cathode off-gas that is discharged from the SOFC 6 and that passes inside the anode off-gas ejector 22 and the anode off-gas ejected from the anode off-gas apertures 22A in the combustion space.

The SOFC system 100 of this embodiment also has cathode off-gas apertures not illustrated around the cylindrical member 121. By ejecting cathode off-gas from those cathode off-gas apertures, excessive rise of the temperature of the truncated cone member 221 and the like of the burner 20 due to flames is suppressed.

<Cathode Off-Gas Ejector 23>

As shown in FIG. 2, in plan view, the cathode off-gas ejector 23 is formed of an annular member surrounding the anode off-gas ejector 22 and centered at the central axis 300.

More specifically, as shown in FIG. 3, the cathode off-gas ejector 23 includes an annular upper wall 123, an annular lower wall 223, and a cylindrical wall 323. The circular inner end of the annular upper wall 123 is connected with the circular upper end of the cylindrical wall 323. The circular inner end of the annular lower wall 223 is connected with the circular lower end of the cylindrical wall 323. The annular lower wall 223 is supported on (connected with) a flat portion 322B of the upper wall 322 of the anode off-gas ejector 22. As the inner diameter of the lower annular lower wall 223 is substantially equal to the inner diameter of the upper annular upper wall 123, the cylindrical wall 323 extends in the vertical direction.

At appropriate points of the cylindrical wall 323, the second cathode off-gas apertures 21B from which cathode off-gas is ejected are provided on the other of the opposite sides of the anode off-gas apertures 22A such that the vector 402 of the ejecting direction of cathode off-gas forms the second acute angle θ2 with the vector 500 of the ejecting direction of anode off-gas. The anode off-gas apertures 22A are spaced from the second cathode off-gas apertures 21B by the second minimum distance L2.

Details of the arrangement position, geometries, dimensions, and the number of the second cathode off-gas apertures 21B will be described later.

Thus, cathode off-gas passing through the peripheral openings in the partition wall portion 51 (see FIG. 1) and diffusing upwardly is ejected into the combustion space from the second cathode off-gas apertures 21B of the cathode off-gas ejector 23. In other words, the cathode off-gas ejector 23 and the anode off-gas ejector 22 have the functions of mixing and burning a part of the cathode off-gas that is discharged from the SOFC 6 and that passes outside the anode off-gas ejector 22 and the anode off-gas ejected from the anode off-gas apertures 22A in the combustion space.

<Cathode Off-Gas Ejector 24>

As shown in FIG. 2, in plan view, the cathode off-gas ejector 24 is formed of an annular member surrounding the anode off-gas ejector 22 and centered at the central axis 300.

As shown in FIG. 3, the cathode off-gas ejector 24 includes an annular upper wall 124, an annular lower wall 224, and a truncated cone wall 324. The circular inner end of the annular upper wall 124 is connected with the circular upper end of the truncated cone wall 324. The circular inner end of the annular lower wall 224 is connected with the circular lower end of the truncated cone wall 324. As the inner diameter of the lower annular lower wall 224 is larger than the inner diameter of the upper annular upper wall 124, the truncated cone wall 324 is inclined downwardly from the inner side to the outer side.

At appropriate points of the truncated cone wall 324 of the cathode off-gas ejector 24, the fourth cathode off-gas apertures 21D from which cathode off-gas is ejected are provided on the other of the opposite sides of the anode off-gas apertures 22A above the second cathode off-gas apertures 21B such that the vector 404 of the ejecting direction of cathode off-gas forms the fourth acute angle θ4 with the vector 500 of the ejecting direction of anode off-gas.

Details of the arrangement position, geometries, dimensions, and the number of the fourth cathode off-gas apertures 21D will be described later.

Thus, cathode off-gas passing through the peripheral openings in the partition wall portion 51 (see FIG. 1) and diffusing upwardly is ejected into the combustion space from the fourth cathode off-gas apertures 21D of the cathode off-gas ejector 24. In other words, the cathode off-gas ejector 24 and the anode off-gas ejector 22 have the functions of mixing and burning a part of the cathode off-gas that is discharged from the SOFC 6 and that passes outside the anode off-gas ejector 22 and the anode off-gas ejected from the anode off-gas apertures 22A in the combustion space.

The configurations of the cathode off-gas ejector 21, the anode off-gas ejector 22, the cathode off-gas ejector 23, and the cathode off-gas ejector 24 described above are exemplary and not limited to the present example.

For example, connections between the components of the cathode off-gas ejector 21, the anode off-gas ejector 22, the cathode off-gas ejector 23, and the cathode off-gas ejector 24 may be in any form. These components may be formed of a single metal plate member by, for example, appropriate bending or may be formed of separate metal plate members by an appropriate fixing measures (for example, welding).

Next, the detailed configurations of the anode off-gas apertures 22A, the first cathode off-gas apertures 21A, the second cathode off-gas apertures 21B, the third cathode off-gas apertures 21C, and the fourth cathode off-gas apertures 21D of the burner 20 will be described in sequence.

<Anode Off-Gas Apertures 22A>

As mentioned above, the anode off-gas ejector 22 of the burner 20 has the inclined portion 322A on the upper wall 322, in which the anode off-gas apertures 22A are provided. The inclined portion 322A accordingly forms an annular anode off-gas wall surface having the multiple anode off-gas apertures 22A formed therein at predetermined intervals in the circumferential direction. This enables appropriate dispersion of anode off-gas when the anode off-gas flows into the combustion space from the anode off-gas apertures 22A.

The anode off-gas apertures 22A are formed as round holes, for example. In this case, the diameter of the anode off-gas apertures 22A is set at about 1.6 mm to 2.0 mm, for example, for preventing occurrence of a flashback.

The anode off-gas apertures 22A are provided in the inclined portion 322A of the upper wall 322 such that the vector 500 of the ejecting direction of anode off-gas is directed toward the central axis 300 of the burner 20.

This can make the burner 20 compact.

In the example shown in FIG. 3, the angle θ formed by the vector 500 of the ejecting direction of anode off-gas and the vector of the central axis 300 of the burner 20 is set at about 45°. In this case, since the inclined portion 322A of the upper wall 322 is inclined by about 45°, the anode off-gas apertures 22A are provided in the inclined portion 322A so that anode off-gas is ejected perpendicularly to the inclined portion 322A.

The anode off-gas apertures 22A are formed at about 24 to 32 positions, for example, equally spaced in the circumferential direction of the annular inclined portion 322A. The number of the anode off-gas apertures 22A can be determined based on a preferable value of the ejection velocity U of anode off-gas. The way of determination will be described later in detail.

Details of the arrangement position, geometries, dimensions, and the number of the anode off-gas apertures 22A described above are exemplary and not limited to the present example.

<First Cathode Off-Gas Apertures 21A>

As mentioned above, the cathode off-gas ejector 21 of the burner 20 has the annular flange 221B of the truncated cone member 221, in which the first cathode off-gas apertures 21A are provided. The annular flange 221B accordingly forms the annular first cathode off-gas wall surface having the multiple first cathode off-gas apertures 21A formed therein at predetermined intervals in the circumferential direction. This enables appropriate dispersion of cathode off-gas when the cathode off-gas flows into the combustion space from the first cathode off-gas apertures 21A.

The shape and size of the first cathode off-gas apertures 21A may be similar to those of the anode off-gas apertures 22A. Also, the arrangement positions of the first cathode off-gas apertures 21A (the hole spacing and arrangement period in the circumferential direction) may be similar to the arrangement positions of the anode off-gas apertures 22A (the hole spacing and arrangement period in the circumferential direction). Thus, in this case, the first cathode off-gas apertures 21A are formed as round holes, for example. The diameter of the first cathode off-gas apertures 21A is set at about 1.6 mm to 2.0 mm, for example.

The first cathode off-gas apertures 21A are provided in the annular flange 221B of the truncated cone member 221 such that the vector 401 of the ejecting direction of cathode off-gas is parallel with the central axis 300 of the burner 20. Also, the first cathode off-gas apertures 21A are provided in the annular flange 221B so that cathode off-gas is ejected perpendicularly to the annular flange 221B.

Details of the arrangement position, geometries, dimensions, and the number of the first cathode off-gas apertures 21A described above are exemplary and not limited to the present example.

<Third Cathode Off-Gas Apertures 210>

As mentioned above, the cathode off-gas ejector 21 has the conical inclined portion 221A of the truncated cone member 221, in which the third cathode off-gas apertures 21C are provided. Thus, the conical inclined portion 221A forms an annular third cathode off-gas wall surface having the multiple third cathode off-gas apertures 21C formed therein at predetermined intervals in the circumferential direction. This enables appropriate dispersion of cathode off-gas when the cathode off-gas flows into the combustion space from the third cathode off-gas apertures 21C.

The shape and size of the third cathode off-gas apertures 21C may be similar to those of the anode off-gas apertures 22A. Thus, in this case, the third cathode off-gas apertures 21C are formed as round holes, for example. The diameter of the third cathode off-gas apertures 21C is set at about 1.6 mm to 2.0 mm, for example.

In this example, the third cathode off-gas apertures 21C are provided in three rows at equal intervals in the direction of inclination of the conical inclined portion 221A. The hole spacing of the third cathode off-gas apertures 21C in the circumferential direction per row may be similar to the hole spacing of the anode off-gas apertures 22A in the circumferential direction. As shown in FIG. 2, however, the arrangement period of the third cathode off-gas apertures 21C in the second (middle) row in the circumferential direction is shifted by half the hole spacing relative to the arrangement period of the third cathode off-gas apertures 21C of the first and third rows in the circumferential direction. The arrangement period of the third cathode off-gas apertures 21C in the second (middle) row in the circumferential direction coincides with the arrangement period of the anode off-gas apertures 22A in the circumferential direction. That is, the arrangement period of the third cathode off-gas apertures 21C of the first and third rows in the circumferential direction is shifted by half the hole spacing relative to the arrangement period of the anode off-gas apertures 22A in the circumferential direction.

The third cathode off-gas apertures 21C are provided in the conical inclined portion 221A of the truncated cone member 221 such that the vector 403 of the ejecting direction of cathode off-gas is at a desired angle to the central axis 300 of the burner 20.

Details of the arrangement position, geometries, dimensions, and the number of the third cathode off-gas apertures 21C are exemplary and not limited to the present example.

<Second Cathode Off-Gas Apertures 21B>

As mentioned above, the cathode off-gas ejector 23 of the burner 20 has the cylindrical wall 323, in which the second cathode off-gas apertures 21B are provided. Thus, the cylindrical wall 323 forms the annular second cathode off-gas wall surface having the multiple second cathode off-gas apertures 21B formed therein at predetermined interval in the circumferential direction. This enables appropriate dispersion of cathode off-gas when the cathode off-gas flows into the combustion space from the second cathode off-gas apertures 21B.

The shape and size of the second cathode off-gas apertures 21B may be similar to those of the anode off-gas apertures 22A. Also, the arrangement positions of the second cathode off-gas apertures 21B (the hole spacing and arrangement period in the circumferential direction) may be similar to the arrangement positions (the hole spacing and arrangement period in the circumferential direction) of the anode off-gas apertures 22A. Thus, in this case, the second cathode off-gas apertures 21B are formed as round holes, for example. The diameter of the second cathode off-gas apertures 21B is set at about 1.6 mm to 2.0 mm, for example.

The second cathode off-gas apertures 21B are provided in the cylindrical wall 323 such that the vector 402 of the ejecting direction of cathode off-gas is perpendicular to the central axis 300 of the burner 20. That is, the second cathode off-gas apertures 21B are provided in the cylindrical wall 323 so that cathode off-gas is ejected perpendicularly to the cylindrical wall 323.

Details of the arrangement position, geometries, dimensions, and the number of the second cathode off-gas apertures 21B described above are exemplary and not limited to the present example.

<Fourth Cathode Off-Gas Apertures 21D>

As mentioned above, the cathode off-gas ejector 24 of the burner 20 has the truncated cone wall 324, in which the fourth cathode off-gas apertures 21D are provided. Thus, the truncated cone wall 324 forms the annular fourth cathode off-gas wall surface having the multiple fourth cathode off-gas apertures 21D formed therein at predetermined interval in the circumferential direction. This enables appropriate dispersion of cathode off-gas when the cathode off-gas flows into the combustion space from the fourth cathode off-gas apertures 21D.

The shape and size of the fourth cathode off-gas apertures 21D may be similar to those of the anode off-gas apertures 22A. Thus, in this case, the fourth cathode off-gas apertures 21D are formed as round holes, for example. The diameter of the fourth cathode off-gas apertures 21D is set at about 1.6 mm to 2.0 mm, for example.

In this example, the fourth cathode off-gas apertures 21D are provided in two rows in the direction of inclination of the truncated cone wall 324. The hole spacing of the fourth cathode off-gas apertures 21D in the circumferential direction per row may be similar to the hole spacing of the anode off-gas apertures 22A in the circumferential direction. However, the arrangement period of the fourth cathode off-gas apertures 21D of the second (upper) row in the circumferential direction is shifted by half the hole spacing relative to the arrangement period of the fourth cathode off-gas apertures 21D of the first (lower) row in the circumferential direction. The arrangement period of the fourth cathode off-gas apertures 21D of the second row in the circumferential direction coincides with the arrangement period of the anode off-gas apertures 22A in the circumferential direction. That is, the arrangement period of the fourth cathode off-gas apertures 21D of the first row in the circumferential direction is shifted by half the hole spacing relative to the arrangement period of the anode off-gas apertures 22A in the circumferential direction.

The fourth cathode off-gas apertures 21D are provided in the truncated cone wall 324 such that the vector 404 of the ejecting direction of cathode off-gas is at a desired angle to the central axis 300 of the burner 20.

Details of the arrangement position, geometries, dimensions, and the number of the fourth cathode off-gas apertures 21D are exemplary and not limited to the present example.

Consequently, in the SOFC system 100 of this embodiment, a third cathode off-gas apertures 21C of the second (middle) row, a first cathode off-gas aperture 21A, an anode off-gas aperture 22A, a second cathode off-gas aperture 21B (see FIG. 3 as it is hidden in FIG. 2), and a fourth cathode off-gas aperture 21D of the second (upper) row (see FIG. 3 as it is hidden in FIG. 2) are aligned on a straight line 200 when the burner 20 is seen in plan view (see FIG. 2).

This enables appropriate formation of flames along the vector 500 of the ejecting direction of anode off-gas. More specifically, due to alignment of the first cathode off-gas aperture 21A and the second cathode off-gas aperture 21B with the anode off-gas aperture 22A on the straight line 200, flames can appropriately move to the neighboring first cathode off-gas apertures 21A. In addition, the flames are enclosed by the cathode off-gas ejected from the first cathode off-gas apertures 21A and the second cathode off-gas apertures 21B, so that flames can be formed symmetrically without irregularity so as to conform to the vector 500 of the ejecting direction of anode off-gas.

It has been found that parameters such as the first acute angle $\theta 1$, the second acute angle $\theta 2$, the third acute angle $\theta 3$, and the fourth acute angle $\theta 4$, the first minimum distance L1 and the second minimum distance L2, and the ejection velocity U significantly affect the combustion performance in the burner 20 through visualized combustion experiments with the line-type combustion experimental device 120 and visualization of gas flow velocity distribution with a fluid simulation.

For the SOFC system 100 of this embodiment, the first acute angle $\theta 1$ and the second acute angle $\theta 2$ are set at about 45°. The third acute angle $\theta 3$ and the fourth acute angle $\theta 4$ are set at about 70°. The first minimum distance L1 and the second minimum distance L2 are set at about 7 mm. The fact that these setting values are preferable values for the combustion performance in the burner 20 will be described later in detail. These setting values are exemplary and not limited to the present example, however.

In the following, the line-type combustion experimental device 120 will be generally described and then preferable ranges of the parameters for the burner 20 will be discussed in sequence.

[Line-Type Combustion Experimental Device]

Figure 4:
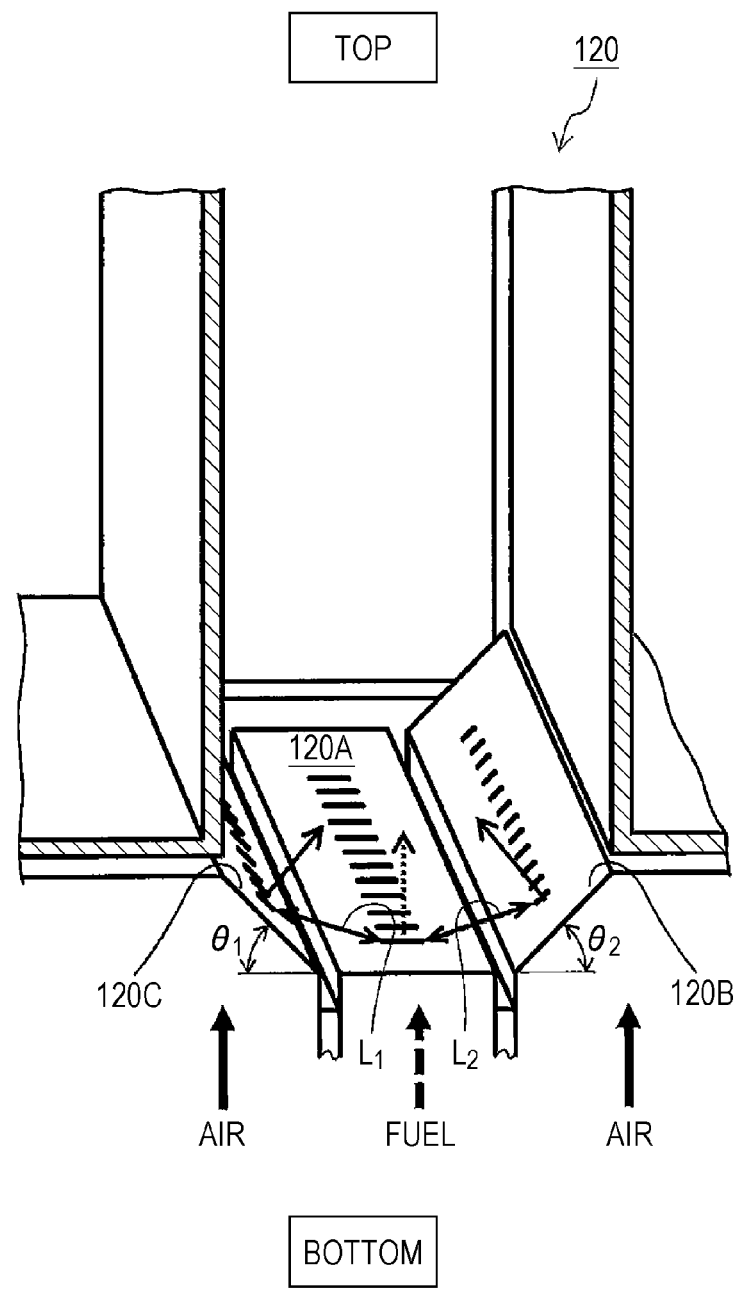
FIG. 4 shows an example of a line-type combustion experimental device for visualized combustion experiments.

FIG. 4 shows an example of a line-type combustion experimental device. The line-type combustion experimental device 120 is a device for determining the preferable ranges of the aforementioned parameters that affect the combustion performance in the burner 20 and the like in a simple manner.

The line-type combustion experimental device 120 includes a rectangular center wall surface 120A disposed horizontally, and a pair of a rectangular inclined wall surface 120B and a rectangular inclined wall surface 120C that are inclined upwardly by inclination angle $\theta 1$ and inclination angle θ2 respectively from the opposite ends of the center wall surface 120A outwardly.

In the longitudinal direction (the depth direction) of the center wall surface 120A, multiple fuel apertures from which fuel (for example, equivalent to anode off-gas) is ejected perpendicularly to the center wall surface 120A are formed in line at predetermined intervals.

In the longitudinal direction (the depth direction) of the inclined wall surface 120B, multiple air apertures from which air (for example, equivalent to cathode off-gas) is ejected perpendicularly to the inclined wall surface 120B are formed in line at the same intervals as the fuel apertures. The minimum distance between the air apertures in the inclined wall surface 120B and the fuel apertures in the center wall surface 120A is distance $L_2$.

In the longitudinal direction (the depth direction) of the inclined wall surface 120C, multiple air apertures from which air (for example, equivalent to cathode off-gas) is ejected perpendicularly to the inclined wall surface 120C are formed in line at the same intervals as the fuel apertures. The minimum distance between the air apertures in the inclined wall surface 120C and the fuel apertures in the center wall surface 120A is distance $L_1$.

In the line-type combustion experimental device 120, a region on the front side of the center wall surface 120A is covered with heat resistant glass not illustrated. Thus, the line-type combustion experimental device 120 is configured to permit visualization of change of the combustion state through the heat resistant glass when the inclination angle $\theta_1$, inclination angle $\theta_2$, distance $L_1$, and distance $L_2$ described above are varied.

From comparison of the configuration of the burner 20 in FIG. 3 with that of the line-type combustion experimental device 120 in FIG. 4, it is easily understood that inclination angle $\theta_1$ is a design parameter equivalent to the first acute angle $\theta_1$ of the burner 20 and the inclination angle $\theta_2$ is a design parameter equivalent to the second acute angle θ2 of the burner 20. It is also easily understood that distance $L_1$ is a design parameter equivalent to the first minimum distance L1 of the burner 20 and distance $L_2$ is a design parameter equivalent to the second minimum distance L2 of the burner 20.

The line-type combustion experimental device 120 thus is an experimental device that allows estimation of the preferable ranges of the design parameters for the burner 20 through a visualized combustion experiment by facilitating change of the inclination angle $\theta_1$, inclination angle $\theta_2$, distance $L_1$, and distance $L_2$.

The line-type combustion experimental device 120 is also an experimental device that allows estimation of the preferable ranges of operational parameters, such as the ejection velocity U of anode off-gas ejected from the anode off-gas apertures 22A, for example, when the design parameters of the burner 20 are fixed at certain values, through a visualized combustion experiment.

[Determination of Parameters for Burner 20]

A characteristic of the SOFC system 100 is that, unlike a solid polymer electrolyte fuel cell (PEFC) system, it uses only anode off-gas and cathode off-gas as the fuel for combustion during power generation of the SOFC 6 and the anode off-gas has a low content of combustible components (hydrogen gas, carbon monoxide gas). Another characteristic relating to cathode off-gas is that the flow rate of cathode off-gas significantly varies depending on the way of temperature control on the SOFC 6 and an air utilization ratio (Ua) because the SOFC 6 operates at high temperatures (about 600° C. to 750° C.). The burner 20 is hence required to stabilize combustion in a state in which the air ratio and the fuel content are not always optimal.

Additionally, as mentioned above, the fuel components in the burner 20 differ during activation and power generation of the SOFC system 100. For example, in the burner 20, high-heat and high-oxygen combustion (hereinafter "hydrocarbon gas combustion") takes place during activation, while low-heat and low-oxygen combustion (hereinafter "lean hydrogen combustion") takes place during stable power generation. The burner 20 is hence required to be able to perform both types of combustion stably.

Also, the fuel utilization ratio Uf has to be set at a high value because the SOFC 6 is required to provide highly efficient power generation in terms of increasing environmental awareness and demand for energy saving in these years. As the fuel utilization ratio Uf is higher, the power generation efficiency of the SOFC 6 increases; however, this has the disadvantage of higher possibility of a misfire in the burner 20, for example, because fuel with a low quantity of combustible components is used in the burner 20. Also, when control for varying the air flow rate is effected for temperature control on the SOFC 6, the cathode off-gas flow rate will vary irrespective of the combustion characteristics in the burner 20, which also can cause a misfire in the burner 20. When the fuel thins down, the required oxygen amount decreases, so that in many cases combustion occurs in a state with a high air ratio. The burner 20 is hence required to be able to stably perform such lean hydrogen combustion and combustion in a state with a high air ratio.

Estimating from various kinds of disclosed information, the fuel utilization ratio Uf of a typical SOFC 6 currently available for home use is about 60% to 75%. Since it is necessary for the fuel utilization ratio Uf to also operate above the current upper limit, the composition of anode off-gas at a fuel utilization ratio Uf of 75% was calculated. As the result of the calculation, and assuming that town gas is supplied at a flow rate of 2.08 NLM, reforming water is supplied at 4.88 g/min so that S/C is 2.50, and complete reforming reaction takes place in the reformer 2, anode off-gas contains about 16 mol % of hydrogen gas when 700 W power generation is performed at an AC end of the SOFC system 100.

Thus, the preferable ranges of the parameters for the burner 20 were studied as follows for a case where lean hydrogen fuel with a low concentration of hydrogen gas (for example, lean hydrogen fuel with a fuel utilization ratio Uf of about 80%) is used as fuel. The preferable ranges of the parameters for the burner 20 that can stabilize both lean hydrogen combustion and hydrocarbon gas combustion were also studied.

<Preferable Range of Fuel Ejection Velocity U>

The relationship between the fuel ejection velocity U (m/s) and the stability of lean hydrogen combustion (Uf=80%) was experimentally verified using the line-type combustion experimental device 120.

In this experiment, the design parameters of the line-type combustion experimental device 120 were set as follows. The reasons for setting inclination angle $\theta_1$ and inclination angle $\theta_2$ at 45° and distance $L_1$ and distance $L_2$ at 7 mm will be described later.

Inclination angle $\theta_1$=45° (a fixed value), distance $L_1$=7 mm (a fixed value)

Inclination angle $\theta_2$=45° (a fixed value), distance $L_2$=7 mm (a fixed value)

The experiment was conducted by gradually changing the ejection velocity U of lean hydrogen (fuel) that contains hydrogen of an amount equivalent to a fuel utilization ratio Uf of 80% and checking the range of the air ratio in which flames did not cause a misfire upon each change of the ejection velocity U.

As a result, the flame blew out at 3.4 m/s or higher. At 2.0 m/s or lower, the range of the air ratio in which flames did not cause a misfire was extremely narrow and thus was not practical.

Based on the foregoing, the preferable range of the ejection velocity U of lean hydrogen fuel was found to be the range shown by Equation (1) below. Although concerning a case of hydrocarbon gas combustion rather than lean hydrogen combustion, it is known also theoretically that a preferable value of the fuel ejection velocity U is about 2.0 m/s.

$$2.0 \text{ m/s} < \text{ejection velocity } U(\text{m/s}) < 3.0 \text{ m/s} \qquad (1)$$

In the market, there is a demand for improved power generation efficiency during the rated operation of the SOFC system 100 (for example, about 700 VAC for a household fuel cell), and it is necessary to burn the thinnest fuel as the fuel in the burner 20 under such an operation condition.

Thus, the number of anode off-gas apertures 22A is optimized for the flow rate of anode off-gas discharged during the rated power generation of the SOFC system 100 based on the results of the experiment above. Specifically, once the ejection velocity U of anode off-gas is determined, the number of the anode off-gas apertures 22A can be determined from the flow rate of anode off-gas discharged during the rated power generation of the SOFC system 100 and the opening area of the anode off-gas apertures 22A.

<Preferable Ranges of First Acute Angle θ1 and Second Acute Angle θ2>

The relationship between the first acute angle θ1 and the second acute angle θ2 of the burner 20 and the stability of each of lean hydrogen combustion (Uf=80%) and hydrocarbon gas combustion was experimentally verified using the line-type combustion experimental device 120. FIG. 5 shows the results of the experiment.

In this experiment, the design parameters of the line-type combustion experimental device 120 were set as follows. The reason for setting distance $L_1$ and distance $L_2$ at 7 mm will be described later.
Inclination angle $\theta_1$=30°, 45°, 70°, distance $L_1$=7 mm (fixed values)
Inclination angle $\theta_2$=30°, 45°, 70°, distance $L_2$=7 mm (fixed values)
The fuel ejection velocity U was set at 2.7 m/s (a fixed value) for consistency with Equation (1).

As shown in FIG. 5, it was found that low-heat combustion (lean hydrogen combustion) and high-heat combustion (hydrocarbon gas combustion) were compatible with each other (are stabilized) when the inclination angle $\theta_1$ (corresponding to the first acute angle θ1 of the burner 20) and inclination angle $\theta_2$ (corresponding to the second acute angle θ2 of the burner 20) were about 45°.

When intended only for low-heat combustion (lean hydrogen combustion), it was found that the preferable range of inclination angle $\theta_1$ and inclination angle $\theta_2$ expanded to a range from about 45° or more to about 70° or less. That is, when inclination angle $\theta_1$ and inclination angle $\theta_2$ are about 70°, the local air ratio λ1 stabilized in the range of 1.5 to 3.0 for low-heat combustion (lean hydrogen combustion) but did not stabilize for high-heat combustion (hydrocarbon gas combustion) due to combustion oscillation. This is due to the following reason.

Since the absolute amount of oxygen required is large whereas the amount of fuel is small in high-heat combustion (hydrocarbon gas combustion), it is presumed that a wall of air blocks the flow of fuel having a low ejection velocity to cause combustion oscillation in a case where the inclination angle $\theta_1$ and inclination angle $\theta_2$ are about 70°. When inclination angle $\theta_1$ and inclination angle $\theta_2$ are about 45°, it is presumed that blocking of the flow of fuel by the wall of air is suppressed, thus stabilizing high-heat combustion (hydrocarbon gas combustion).

With the inclination angle $\theta_1$ and the inclination angle $\theta_2$ of about 30°, neither low-heat combustion (lean hydrogen combustion) nor high-heat combustion (hydrocarbon gas combustion) stabilized.

Based on these results, phenomenons in the combustion region during lean hydrogen combustion were scrutinized using the line-type combustion experimental device 120 and fluid simulation.

Figure 6:
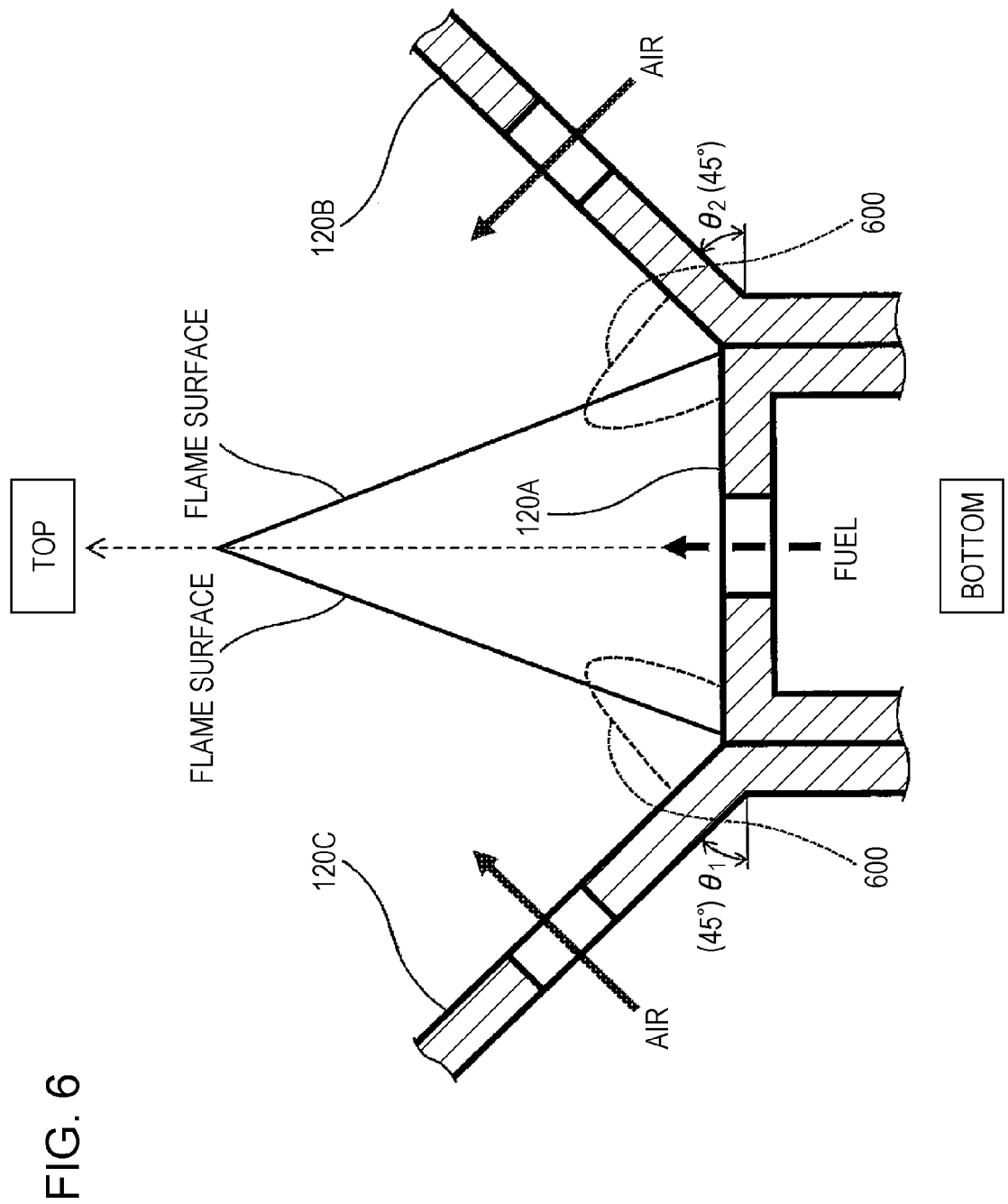
FIG. 6 schematically illustrates a flame in lean hydrogen combustion (Uf=80%) with the line-type combustion experimental device.

FIG. 6 schematically illustrates a flame in lean hydrogen combustion (Uf=80%) with the line-type combustion experimental device. Here, the inclination angle $\theta_1$, inclination angle $\theta_2$, distance $L_1$, and distance $L_2$ were set at 45°, 45°, 7 mm, and 7 mm, respectively, and the fuel ejection velocity U was set at 2.7 m/s for consistency with Equation (1). The local air ratio λ1 was then varied from around 1.0 to 5.0 and the flame in combustion was visually observed through a heat resistant glass wall.

As a result of the observation, it was confirmed through a visualized combustion experiment with the line-type combustion experimental device 120 that the flame surface extended downwards to attach to the center wall surface 120A of the line-type combustion experimental device 120, as shown in FIG. 6. Although not shown in the drawing, it was confirmed through a visualized combustion experiment with the line-type combustion experimental device 120 that, with those design parameters of the line-type combustion experimental device 120 that do not stabilize lean hydrogen combustion, the flame surface did not extend downwards but broke and lifted up in the space.

Such attachment of the flame surface is considered to promote heat transfer from the high-temperature flame to the fuel and the air. It is determined that this in turn promotes combustion chemical reaction, so that lean hydrogen combustion can be stabilized. We have concluded that such attachment of the flame surface is associated with formation of stagnant regions 600, in which the flow velocities of the fuel and the air are nearly zero, in the vicinity of corners between the center wall surface 120A and the inclined wall surfaces 120B, 120C.

Figure 7:
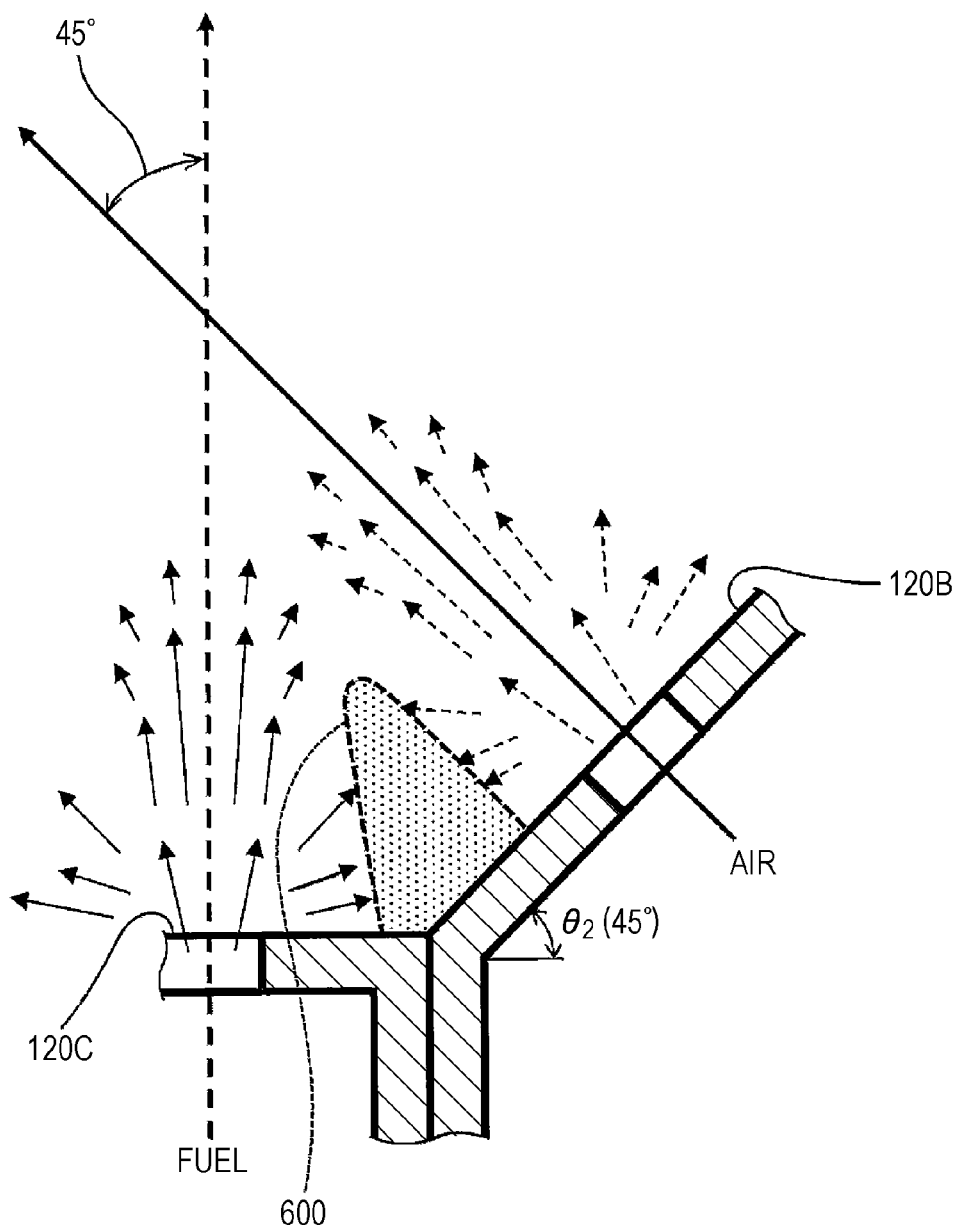
FIG. 7 schematically illustrates flow fields in the corner between a center wall surface and an inclined wall surface of the line-type combustion experimental device in FIG. 6.

FIG. 7 schematically illustrates flow fields in the corner between the center wall surface and an inclined wall surface of the line-type combustion experimental device in FIG. 6. In FIG. 7, velocity vectors for the fuel in a fluid simulation are indicated by solid-line arrows and velocity vectors for the air in the fluid simulation are indicated by dashed-line arrows.

As a result of a flow field simulation, it was found that a diffusive fuel (hydrogen) had the property of diffusing toward the corner (in the lateral direction) in a spraying manner after being ejected from the fuel aperture as shown in FIG. 7. The fuel was observed to subsequently collide with the diffusing air from the opposite side in the corner and mix with the air. The resulting formation of the stagnant region 600, in which the flow velocities of the fuel and the air are nearly zero, in the corner was reproduced on a model for the fluid simulation.

It was thus verified that ejecting of cathode off-gas from the first cathode off-gas apertures 21A and the second cathode off-gas apertures 21B, which neighbor the anode off-gas apertures 22A on the opposite sides, to the vector 500 of the ejecting direction of anode off-gas within a desired ejecting range (for example, from 45° or more to 70° or less) was effective for stabilization of lean hydrogen combustion, through visualized combustion experiments with the line-type combustion experimental device 120 and visualization of gas flow velocity distribution with a fluid simulation.

By changing the fuel ejection velocity U and reproducing the flow fields in the corners through a fluid simulation, it was also confirmed that the stagnant region 600 were formed within the range of Equation (1). This is perhaps because at a value of fuel ejection velocity U of 2.0 m/s or higher, the dynamic pressure in the fuel ejecting portion increases and the fuel widely diffuses upon being ejected. Such a diffusion phenomenon of fuel associated with dynamic pressure is also mentioned in "Combustion Characteristics of Carbon Monoxide-Hydrogen-Nitrogen Coflow Diffusion Flame" (Journal of the Combustion Society of Japan, 2006, Vol. 48, No. 143, pp. 136-150), for instance.

Based on the foregoing, the first acute angle θ1 and the second acute angle θ2 are set at about 45° in the SOFC system 100 of this embodiment as mentioned above.

<Preferable Ranges of First Minimum Distance L1 and Second Minimum Distance L2>

The relationship between the first minimum distance L1 and the second minimum distance L2 of the burner 20 and the stability of lean hydrogen combustion (Uf=80%) was experimentally verified using the line-type combustion experimental device 120.

In this experiment, the design parameters of the line-type combustion experimental device 120 were set as follows.
Inclination angle $θ_1$=45° (a fixed value), distance $L_1$ (varied within an appropriate range)
Inclination angle $θ_2$=45° (a fixed value), distance $L_2$ (varied within an appropriate range)

The fuel ejection velocity U was set at 2.7 m/s (a fixed value) for consistency with Equation (1).

The result of the experiment showed that when the distance $L_1$ (corresponding to the first minimum distance L1 of the burner 20) and the distance $L_2$ (corresponding to the second minimum distance L2 of the burner 20) were less than 5 mm, there were the possibility of the flame in the burner 20 blowing out and the possibility of the flame failing to move to the neighboring anode off-gas apertures 22A. It was also found that when the distance $L_1$ and the distance $L_2$ exceeded 10 mm, the flame holding performance of the burner 20 could degrade due to extinction of the stagnant regions 600 described above.

For these reasons, the first minimum distance L1 and the second minimum distance L2 are preferably from 5 mm or more to 10 mm or less.

Also, by equalizing the first minimum distance L1 and the second minimum distance L2 with each other, a symmetrical hole spacing is created and the combustion stability is improved compared to when the first minimum distance L1 and the second minimum distance L2 are not equal. Thus, the first minimum distance L1 and the second minimum distance L2 are preferably equal.

In the SOFC system 100 of this embodiment, the first minimum distance L1 and the second minimum distance L2 are set at 7 mm as mentioned above.

<Handling of High-Heat Combustion (Hydrocarbon Gas Combustion)>

Figure 8:
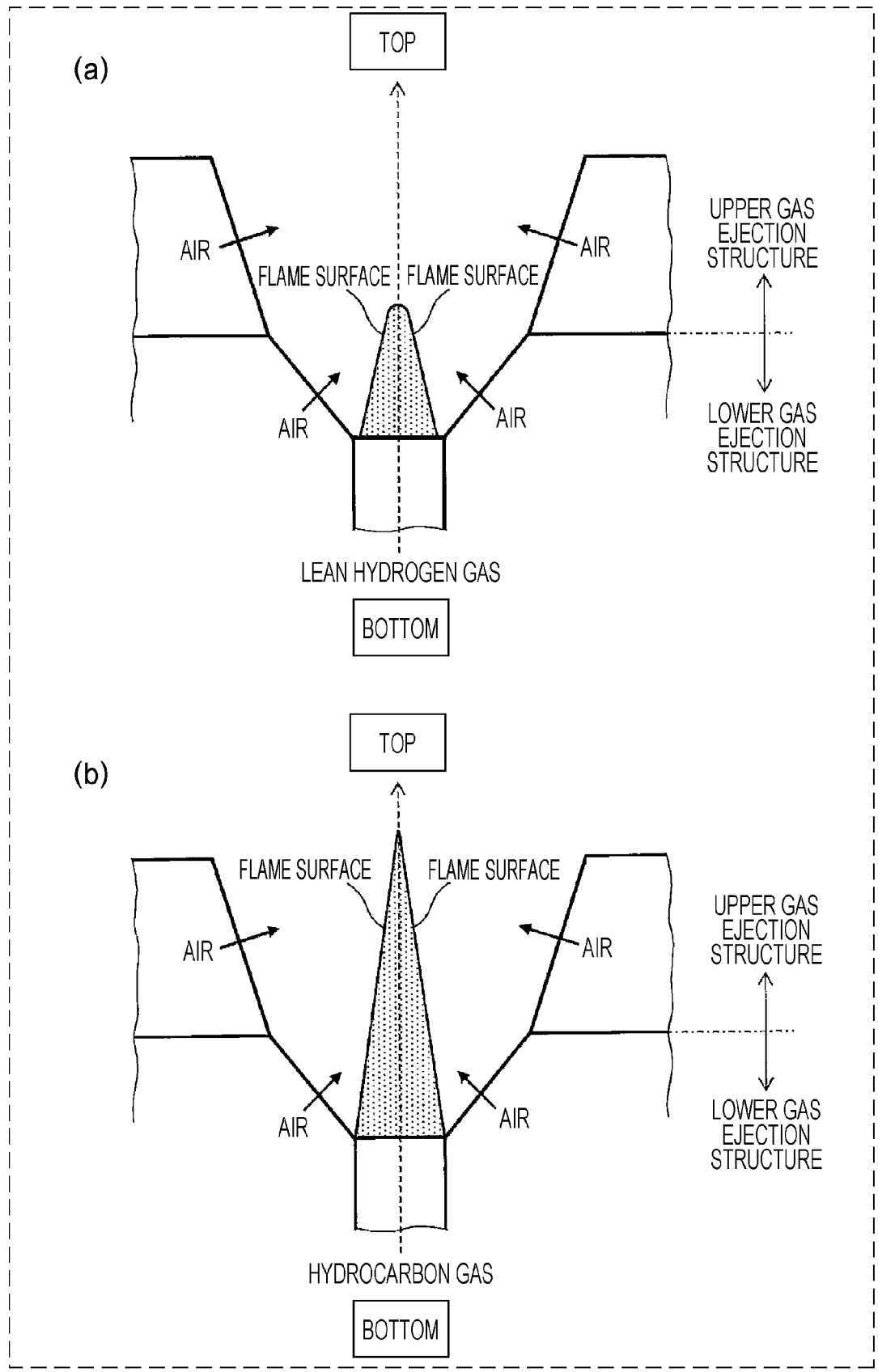
FIG. 8 schematically illustrates flames in low-heat combustion (lean hydrogen combustion) and high-heat combustion (hydrocarbon gas combustion)

FIG. 8 schematically illustrates flames in low-heat combustion (lean hydrogen combustion) and high-heat combustion (hydrocarbon gas combustion). FIG. 8(a) shows flame surfaces in lean hydrogen combustion, having a high burning velocity. FIG. 8(b) shows flame surfaces in hydrocarbon gas combustion, having a low burning velocity.

As shown in FIG. 8, the flame in lean hydrogen combustion is short, but the length of the flame changes from a short flame to a long flame when in hydrocarbon gas combustion. Thus, the characteristic of high-heat combustion (hydrocarbon gas combustion) (a rapid temperature rising effect at the time of activation of the SOFC system 100) cannot be adequately exploited only with the first cathode off-gas apertures 21A and the second cathode off-gas apertures 21B neighboring the anode off-gas apertures 22A.

Accordingly, in the SOFC system 100 of this embodiment, the burner 20 includes the cathode off-gas ejector 21, the cathode off-gas ejector 23, and the cathode off-gas ejector 24 as mentioned above so that the single burner 20 can handle both lean hydrogen combustion with a low calorific value and hydrocarbon gas combustion with a high calorific value.

Specifically, the ejection structure for cathode off-gas in the burner 20 is configured in upper and low two structures. The first cathode off-gas apertures 21A of the cathode off-gas ejector 21 and the second cathode off-gas apertures 21B of the cathode off-gas ejector 23 correspond to the cathode off-gas apertures of the lower gas ejection structure in FIG. 8. The third cathode off-gas apertures 21C of the cathode off-gas ejector 21 and the fourth cathode off-gas apertures 21D of the cathode off-gas ejector 24 correspond to the cathode off-gas apertures of the upper gas ejection structure in FIG. 8.

By adding an inclined wall surface corresponding to the upper gas ejection structure above the inclined wall surfaces 120B, 120C, which correspond to the lower gas ejection structure, in the line-type combustion experimental device 120 of FIG. 4 and using the line-type combustion experimental device 120 in the following manner, a preferable ratio of the cathode off-gas ejection amount of the lower gas ejection structure (hereinafter "lower gas amount") to the cathode off-gas ejection amount of the upper gas ejection structure (hereinafter "upper gas amount") as well as preferable values of the third acute angle θ3 and the fourth acute angle θ4 were determined.

Although detailed description and illustration of the upper gas ejection structure of the line-type combustion experimental device 120 are not provided, the following description assumes that the inclination angle $θ_3$ and inclination angle $θ_4$ of the upper gas ejection structure of the line-type combustion experimental device 120 are design parameters equivalent to the third acute angle θ3 and the fourth acute angle θ4 of the burner 20, respectively.

<The Ratio of the Lower Gas Amount to the Upper Gas Amount>

As shown in FIG. 3, cathode off-gas ejected from the upper gas ejection structure (the third cathode off-gas apertures 21C and the fourth cathode off-gas apertures 21D) is ejected into a region sufficiently higher than the flame formation region in the case of lean hydrogen combustion, which produces short flames. Thus, such cathode off-gas will not lead to further reduction of the combustible gas concentration of lean hydrogen and reduction in the temperature of the flame in lean hydrogen combustion. That is, the upper gas amount is considered to have not much effect on the combustion characteristics of lean hydrogen combustion.

Thus, by conducting a visualized combustion experiment with the line-type combustion experimental device 120 with setting of the ratio of the lower gas amount and the upper gas amount as in Equation (2) below, it was confirmed that lean hydrogen combustion stabilized at the local air ratio λ1 in the range of 1.0 to 4.0.

The lower gas amount: the upper gas amount=25:75    (2)

The ratio of equation (2) is exemplary and not limited to the present example.

Thus, in the SOFC system 100 of this embodiment, the sum of the opening area of the third cathode off-gas apertures 21C and the opening area of the fourth cathode off-gas apertures 21D is set to a value larger than the sum of the opening area of the first cathode off-gas apertures 21A and the opening area of the second cathode off-gas apertures 21B.

For the burner 20 of FIG. 3, the foregoing opening area relationship is satisfied by making the total number of the third cathode off-gas apertures 21C and the fourth cathode off-gas apertures 21D greater than the total number of the first cathode off-gas apertures 21A and the second cathode off-gas apertures 21B. This can secure a sufficient amount of cathode off-gas in hydrocarbon gas combustion in the burner 20, and at the same time, cathode off-gas ejected from the third cathode off-gas apertures 21C and the fourth cathode off-gas apertures 21D bypasses the combustion region during lean hydrogen combustion producing short flames, thus resulting in an appropriate local air ratio λ1 for lean hydrogen combustion as mentioned above.

<Preferable Ranges of Third Acute Angle θ3 and Fourth Acute Angle θ4>

The relationship between the third acute angle θ3 and the fourth acute angle θ4 of the burner 20 and the stability of hydrocarbon gas combustion was experimentally verified using the line-type combustion experimental device 120. FIG. 9 shows the results of the experiment.

In this experiment, the design parameters of the line-type combustion experimental device 120 were set as follows.

For the lower gas ejection structure
 Inclination angle $\theta_1$=45° (a fixed value), distance $L_1$=7 mm (a fixed value)
 Inclination angle $\theta_2$=45° (a fixed value), distance $L_2$=7 mm (a fixed value)
For the upper gas ejection structure
 Inclination angle $\theta_3$=55°, 70°, 90°
 Inclination angle $\theta_4$=55°, 70°, 90°

The fuel ejection velocity U was set at 2.7 m/s (a fixed value) for consistency with Equation (1). The ratio of the lower gas amount to the upper gas amount was set in accordance with Equation (2).

As shown in FIG. 9, it was confirmed that, when the inclination angle $\theta_3$ (corresponding to the third acute angle θ3 of the burner 20) and the inclination angle $\theta_4$ (corresponding to the fourth acute angle θ4 of the burner 20) were about 70°, the range of local air ratio λ1 in which perfect combustion of hydrocarbon gas occurred was maximized compared to other inclination angles. That is, the region enclosed by a dashed line in FIG. 9 represents the region of local air ratio λ1 intended for use in an actual burner 20. As a result, setting of the inclination angle $\theta_3$ and the inclination angle $\theta_4$ at about 70° was verified to be optimal with this experiment.

For these reasons, the third acute angle θ3 and the fourth acute angle θ4 are set at about 70° in the SOFC system 100 of this embodiment as mentioned above.

[Combustion Test on Burner 20]

Figure 12:
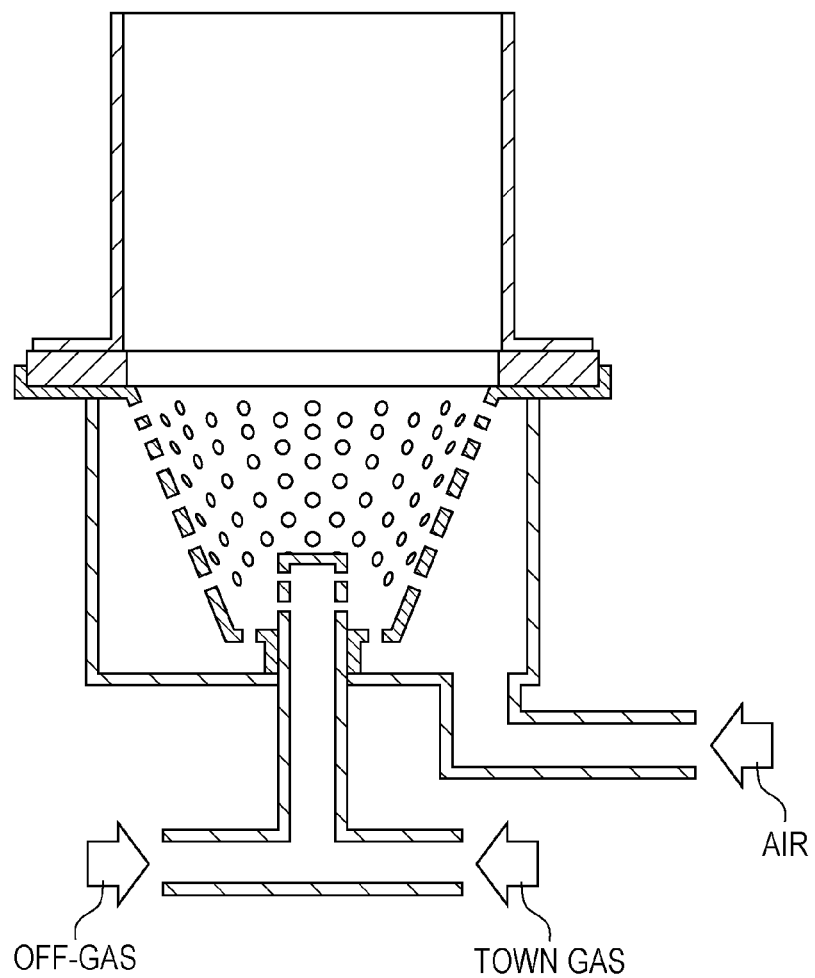
FIG. 12 shows an example of a burner in a fuel cell system according to a conventional example.
Figure 13:
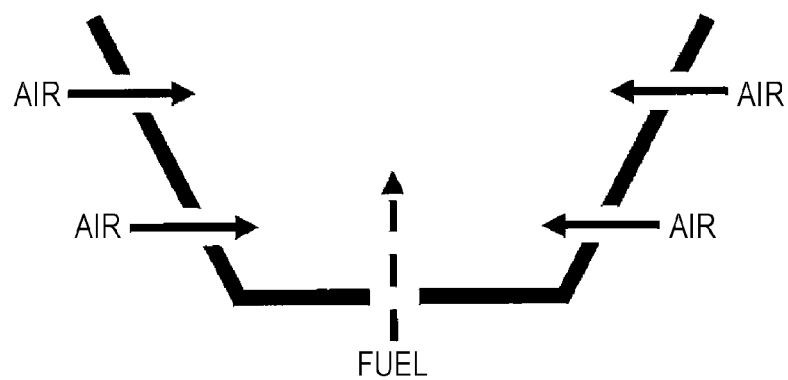
FIG. 13 shows an example of a burner in a fuel cell system according to another conventional example.

With the various parameters of the burner 20 set at the preferable values as follows, a combustion test on the burner 20 was conducted. As a comparative example, a burner (hereinafter "conventional burner") of a similar type to the burner of Japanese Unexamined Patent Application Publication No. 2003-254514 (FIG. 12) was made and a combustion test on the conventional burner was also conducted.

For the lower gas ejection structure
 The first acute angle θ1=45°, the first minimum distance L1=7 mm
 The second acute angle θ2=45°, the second minimum distance L2=7 mm
For the upper gas ejection structure
 The third acute angle θ3=70°
 The fourth acute angle θ4=70°
Anode off-gas ejection velocity U=2.7 m/s
The lower gas amount: the upper gas amount=25:75

Figure 10:
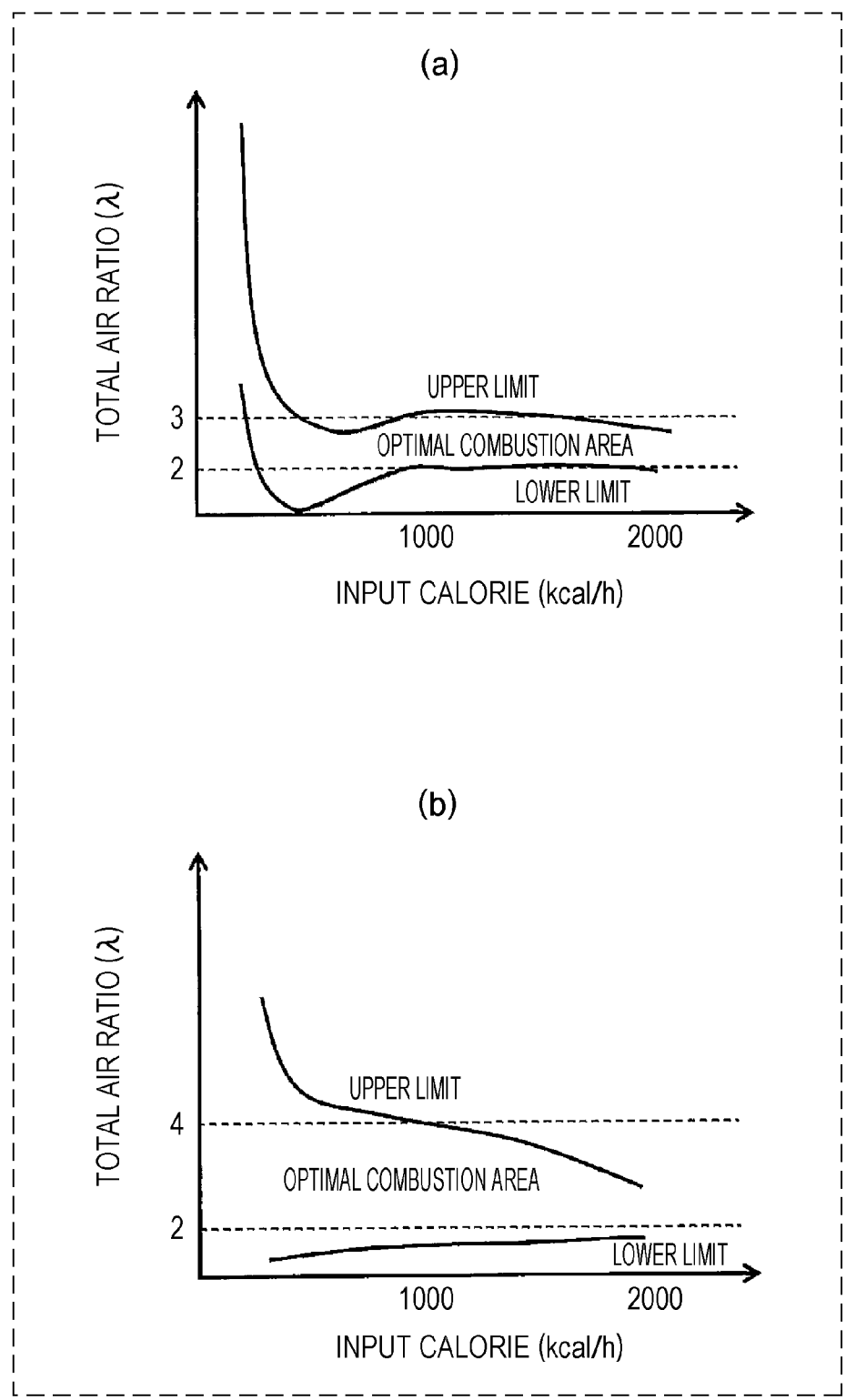
FIG. 10 shows an example of a hydrocarbon gas (town gas) combustion test on the burner of the fuel cell system according to the embodiment.

FIG. 10 shows an example of a hydrocarbon gas (town gas) combustion test on the burner of the fuel cell system according to the embodiment. FIG. 10(*a*) shows an optimal combustion area for a town gas combustion test with the conventional burner, and FIG. 10(*b*) shows an optimal combustion area for a town gas combustion test with the burner 20. The input calorie on the horizontal axis of FIG. 10 is an amount corresponding to the fuel utilization ratio Uf, where the smaller the input calorie, the fuel utilization ratio Uf becomes higher.

As can be seen from FIG. 10, the optimal combustion area for a town gas combustion test with the burner 20 is expanded relative to the optimal combustion area for a town gas combustion test with the conventional burner.

Figure 11:
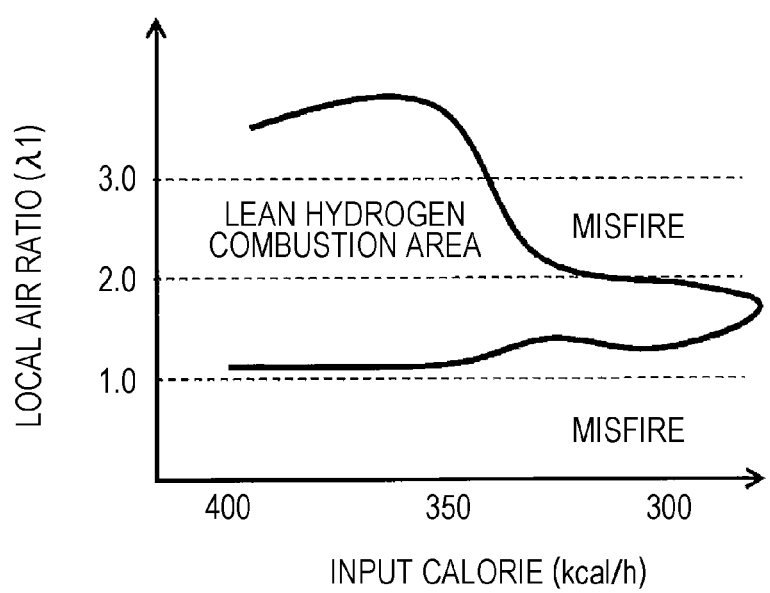
FIG. 11 shows an example of a lean hydrogen combustion test on the burner of the fuel cell system according to the embodiment.

FIG. 11 shows an example of a lean hydrogen combustion test on the burner of the fuel cell system according to the embodiment. The left-hand portion enclosed by a solid line in FIG. 11 represents the region in which lean hydrogen combustion was confirmed. As will be understood from FIG. 11, combustion in the burner 20 takes place appropriately even in lean hydrogen combustion with a low calorific value. Around 400 kcal/h on the horizontal axis of FIG. 11 represents the calorific value of lean hydrogen corresponding to a fuel utilization ratio Uf of about 75%.

As described above, the SOFC system 100 of this embodiment can stabilize combustion in the burner 20 compared to the conventional techniques even when the fuel for the burner 20 thins down.

For example, in contrast to the first conventional example in which anode off-gas and cathode off-gas collide with one another head-on, part of cathode off-gas diffuses diagonally upward after passing through the flame region due to setting of the first acute angle θ1 and the second acute angle θ2 at 45° or more and 70° or less. Thus, further reduction of the concentration of combustible components in lean hydrogen can be suppressed.

Also, since cathode off-gas collides with anode off-gas diagonally so as to enclose the anode off-gas, the mixed gas of the two diffuses upward smoothly. Thus, a rounding phenomenon as in the first conventional example and combustion oscillation as in the second conventional example are suppressed, reducing the possibility of unstable combustion.

In the SOFC system 100 of this embodiment, by setting the ejection velocity U of anode off-gas in a desired range (2.0 m/s<ejection velocity U (m/s)<3.0 m/s), stagnant regions 600, in which the flow velocities of anode off-gas and cathode off-gas are nearly zero, occur in the vicinity of the wall portion of the burner 20 between the anode off-gas apertures 22A and the first cathode off-gas apertures 21A and in the vicinity of the wall portion of the burner 20 between the anode off-gas apertures 22A and the second cathode off-gas apertures 21B. Due to the presence of the stagnant regions 600, the flame surface extends downwards to attach to the wall portion of the burner 20. This can improve the flame holding performance of the burner 20 compared to the cases of the first and second conventional examples. Thus, a promoted combustion chemical reaction of the fuel can stabilize combustion even in lean hydrogen combustion.

The SOFC system 100 of this embodiment can also stabilize both lean hydrogen combustion and hydrocarbon gas combustion in the burner 20 by setting the first acute angle θ1 and the second acute angle θ2 at 45°.

In the SOFC system 100 of this embodiment, the single burner 20 can handle both lean hydrogen combustion with a low calorific value and hydrocarbon gas combustion with a high calorific value.

For example, by setting the first acute angle θ1 and the second acute angle θ2 at 45° and the third acute angle θ3 and the fourth acute angle θ4 at 70°, both lean hydrogen combustion and hydrocarbon gas combustion in the burner 20 can be stabilized. It can also optimize hydrocarbon gas combustion with a high calorific value.

In the SOFC system 100 of this embodiment, the amount of cathode off-gas ejected from the third cathode off-gas apertures 21C and the fourth cathode off-gas apertures 21D can be made larger than the amount of cathode off-gas ejected from the first cathode off-gas apertures 21A and the second cathode off-gas apertures 21B. This can secure a sufficient amount of cathode off-gas in hydrocarbon gas combustion by the burner 20 in a case where the single burner 20 handles both lean hydrogen combustion and hydrocarbon gas combustion. At the same time, cathode off-gas ejected from the third cathode off-gas apertures 21C and the fourth cathode off-gas apertures 21D bypasses the combustion region during lean hydrogen combustion producing short flames, thus resulting in an appropriate air ratio for lean hydrogen combustion.

The SOFC system 100 of this embodiment can also keep combustion in the burner 20 stabilized by setting the first minimum distance L1 and the second minimum distance L2 in the desired range (5 mm≤L1≤10 mm, 5 mm≤L2≤10 mm).

For example, when the first minimum distance L1 and the second minimum distance L2 are less than 5 mm, there are the possibility of the flame in the burner 20 blowing out and the possibility of the flame failing to move to the neighboring anode off-gas apertures 22A. The SOFC system 100 of this embodiment can reduce these possibilities with the configurations described above. When the first minimum distance L1 and the second minimum distance L2 exceed 10 mm, for example, the flame holding performance of the burner 20 could degrade due to extinction of the stagnant regions 600 described above. The SOFC system 100 of this embodiment can reduce such a possibility as well with the configurations described above.

(First Variation)

Although the angle θ formed by the vector 500 of the ejecting direction of anode off-gas and the vector of the central axis 300 of the burner 20 (see FIG. 3) is set at 45° in the SOFC system 100 of this embodiment, the present disclosure is not limited thereto; the angle formed θ may be from 30° or more to 70° or less, for example.

By thus setting the angle formed θ in the predetermined range (30°≤θ≤70°), the SOFC system 100 in this variation can suppress excessive temperature rise of the wall portion of the burner 20 due to flames and also permits reduction in the size of the burner 20.

For example, when the angle formed θ is less than 30°, the temperature of the wall portion of the burner 20 can excessively rise due to flames. The SOFC system 100 in this variation can reduce such a possibility with the configuration described above. When the angle formed θ exceeds 70°, for example, the burner 20 can be large-sized. The SOFC system 100 in this variation can reduce such a possibility as well with the configuration described above.

Except for the foregoing feature, the SOFC system 100 in this variation may be similarly configured to the SOFC system 100 of the embodiment above.

(Second Variation)

The way of making the sum of the opening area of the third cathode off-gas apertures 21C and the opening area of the fourth cathode off-gas apertures 21D larger than the sum of the opening area of the first cathode off-gas apertures 21A and the opening area of the second cathode off-gas apertures 21B is not limited to the configuration of the burner 20 in FIG. 3.

For example, the aforementioned opening area relationship may be satisfied by making the opening area of each individual one of the third cathode off-gas apertures 21C and the fourth cathode off-gas apertures 21D larger than the opening area of each individual one of the first cathode off-gas apertures 21A and the second cathode off-gas apertures 21B.

Alternatively, the aforementioned opening area relationship may be satisfied by making the number of the third cathode off-gas apertures 21C and the fourth cathode off-gas apertures 21D per row of the circumference on which they are provided larger than the number of the first cathode off-gas apertures 21A and the second cathode off-gas apertures 21B per row of the circumference on which they are provided.

Except for the foregoing features, the SOFC system 100 in this variation may be similarly configured to the SOFC system 100 of the embodiment above.

The embodiment, the first variation, and the second variation may be combined with each other as long as they do not exclude one another.

From the foregoing description, many modifications and other embodiments of the present disclosure will be apparent for those skilled in the art. The foregoing description therefore should be construed only as exemplary and is provided for the purpose of teaching the best mode for practicing the present disclosure to those skilled in the art. The structure and/or functional details of the present disclosure may be substantially modified without departing from the spirit thereof.

An aspect of the present disclosure is applicable as a fuel cell system that can stabilize combustion in a burner compared to conventional techniques even when fuel for the burner thins down.

What is claimed is:
1. A fuel cell system comprising:
a fuel cell that generates electrical power with oxidant and fuel; and
a burner in which anode off-gas discharged from an anode of the fuel cell and cathode off-gas discharged from a cathode of the fuel cell burn, wherein an anode off-gas discharge channel connects the anode of the fuel cell and the burner allowing the anode off-gas to flow through the anode of the fuel cell to the burner, and a cathode off-gas discharge channel connects the cathode of the fuel cell and the burner allowing the cathode off-gas to flow through the cathode of the fuel cell to the burner, wherein:
the burner includes anode off-gas apertures from which the anode off-gas is ejected, and first cathode off-gas apertures and second cathode off-gas apertures from which the cathode off-gas is ejected, in a cross section of the burner cutting one of the first cathode off-gas apertures, one of the anode off-gas apertures, and one of the second cathode off-gas apertures that are aligned on a straight line, wherein the one of the first cathode off-gas apertures, the one of the anode off-gas apertures, and the one of the second cathode off-gas apertures are on one side of a central axis of the burner when the burner is seen in a plan view:

the one of the first cathode off-gas apertures is provided on one of opposite sides of the one of the anode off-gas apertures such that a vector of an ejecting direction of the cathode off-gas from the one of the first cathode off-gas apertures forms a first acute angle with a vector of an ejecting direction of the anode off-gas from the one of the anode off-gas apertures, and the one of the second cathode off-gas apertures is provided on another of the opposite sides of the one of the anode off-gas apertures such that a vector of the ejecting direction of the cathode off-gas from the one of the second cathode off-gas apertures forms a second acute angle with the vector of the ejecting direction of the anode off-gas, and the burner includes:

an annular anode off-gas wall surface having the anode off-gas apertures, the anode off-gas apertures being formed at a predetermined interval in a circumferential direction of the annular anode off-gas wall surface;

an annular first cathode off-gas wall surface having the first cathode off-gas apertures, the first cathode off-gas apertures being formed at a predetermined interval in a circumferential direction; and an annular second cathode off-gas wall surface having the second cathode off-gas apertures, the second cathode off-gas apertures being formed at a predetermined interval in a circumferential direction.

2. The fuel cell system according to claim 1, wherein the first acute angle and the second acute angle are 45° or more and 70° or less.

3. The fuel cell system according to claim 2, wherein the first acute angle and the second acute angle are 45°.

4. The fuel cell system according to claim 1, wherein the first acute angle and the second acute angle are equal to each other.

5. The fuel cell system according to claim 1, wherein the burner includes third cathode off-gas apertures and fourth cathode off-gas apertures from which the cathode off-gas is ejected, and in a cross section of the burner cutting one of the third cathode off-gas apertures, one of the first cathode off-gas apertures, one of the anode off-gas apertures, one of the second cathode off-gas apertures, and one of the fourth cathode off-gas apertures that are aligned on a straight line, wherein the one of the third cathode off-gas apertures, the one of the first cathode off-gas apertures, the one of the anode off-gas apertures, the one of the second cathode off-gas apertures, and the one of the fourth cathode off-gas apertures are on one side of a central axis of the burner when the burner is seen in the plan view:

the one of the third cathode off-gas apertures is provided on one of the opposite sides of the one of the anode off-gas apertures above the one of the first cathode off-gas apertures such that a vector of the ejecting direction of the cathode off-gas from the one of the third cathode off-gas apertures forms a third acute angle with the vector of the ejecting direction of the anode off-gas, the one of the fourth cathode off-gas apertures is provided on the other of the opposite sides of the one of the anode off-gas apertures above the one of the second cathode off-gas apertures such that a vector of the ejecting direction of the cathode off-gas from the one of the fourth cathode off-gas apertures forms a fourth acute angle with the vector of the ejecting direction of the anode off-gas, and the third acute angle and the fourth acute angle are different from the first acute angle and the second acute angle.

6. The fuel cell system according to claim 5, wherein the third acute angle and the fourth acute angle are larger than the first acute angle and the second acute angle.

7. The fuel cell system according to claim 6, wherein the first acute angle and the second acute angle are 45°, and the third acute angle and the fourth acute angle are 70°.

8. The fuel cell system according to claim 5, wherein a sum of a total opening area of the third cathode off-gas apertures and a total opening area of the fourth cathode off-gas apertures is greater than a sum of a total opening area of the first cathode off-gas apertures and a total opening area of the second cathode off-gas apertures.

9. The fuel cell system according to claim 1, wherein a first minimum distance between the anode off-gas apertures and the first cathode off-gas apertures and a second minimum distance between the anode off-gas apertures and the second cathode off-gas apertures are from 5 mm or more to 10 mm or less.

10. The fuel cell system according to claim 9, wherein the first minimum distance and the second minimum distance are equal to each other.

11. The fuel cell system according to claim 1, wherein the vector of the ejecting direction of the anode off-gas is directed toward the central axis of the burner.

12. The fuel cell system according to claim 11, wherein an angle formed by the vector of the ejecting direction of the anode off-gas and a vector of the central axis of the burner is from 30° or more to 70° or less.

* * * * *